United States Patent
Shekhar et al.

(10) Patent No.: US 11,403,643 B2
(45) Date of Patent: Aug. 2, 2022

(54) UTILIZING A TIME-DEPENDENT GRAPH CONVOLUTIONAL NEURAL NETWORK FOR FRAUDULENT TRANSACTION IDENTIFICATION

(71) Applicant: Adobe Inc., San Jose, CA (US)

(72) Inventors: Shubhranshu Shekhar, Pittsburg, PA (US); Deepak Pai, Santa Clara, CA (US); Sriram Ravindran, San Jose, CA (US)

(73) Assignee: Adobe Inc., San Jose, CA (US)

( * ) Notice: Subject to any disclaimer, the term of this patent is extended or adjusted under 35 U.S.C. 154(b) by 294 days.

(21) Appl. No.: 16/751,880

(22) Filed: Jan. 24, 2020

(65) Prior Publication Data

US 2021/0233080 A1    Jul. 29, 2021

(51) Int. Cl.
*G06N 3/08*    (2006.01)
*G06Q 20/40*    (2012.01)
*G06Q 30/06*    (2012.01)

(52) U.S. Cl.
CPC ........... *G06Q 20/4016* (2013.01); *G06N 3/08* (2013.01); *G06Q 30/0601* (2013.01)

(58) Field of Classification Search
None
See application file for complete search history.

(56) References Cited

U.S. PATENT DOCUMENTS

| | | | |
|---|---|---|---|
| 10,460,320 B1 * | 10/2019 | Cao | G06N 20/00 |
| 10,721,336 B2 * | 7/2020 | Banerjee | G06F 9/466 |
| 10,965,700 B2 * | 3/2021 | Xie | G06Q 20/12 |
| 2018/0196694 A1 * | 7/2018 | Banerjee | G06F 9/466 |
| 2019/0377819 A1 * | 12/2019 | Filliben | G06N 3/084 |
| 2019/0378010 A1 * | 12/2019 | Morris | G06Q 20/4016 |
| 2020/0007564 A1 * | 1/2020 | Xie | H04L 63/1483 |
| 2020/0074301 A1 * | 3/2020 | Shang | G06N 5/02 |
| 2020/0349573 A1 * | 11/2020 | Dong | G06Q 20/4016 |

FOREIGN PATENT DOCUMENTS

WO    WO-2018138423 A1 *   8/2018    ......... G06Q 20/4016

OTHER PUBLICATIONS

Adam Kleczkowski, and Bryan T. Grenfell, "Mean-filed-type equations for spread of epidemics: the 'small world' Model," Physica A: Statistical Mechanics and its Applications 274 (1999), 355-360. (Year: 1999).*

(Continued)

*Primary Examiner* — Nicholas D Rosen
(74) *Attorney, Agent, or Firm* — Keller Preece PLLC

(57) ABSTRACT

The present disclosure relates to utilizing a graph convolutional neural network to generate similarity probabilities between pairs of digital identities associated with digital transactions based on time dependencies for use in identifying fraudulent transactions. For example, the disclosed systems can generate a transaction graph that includes nodes corresponding to digital identities. The disclosed systems can utilize a time-dependent graph convolutional neural network to generate node embeddings for the nodes based on the edge connections of the transaction graph. Further, the disclosed systems can utilize the node embeddings to determine whether a digital identity is associated with a fraudulent transaction.

20 Claims, 13 Drawing Sheets

(56) References Cited

OTHER PUBLICATIONS

Hawoong Jeong, Balint Tombor, Reka Albert, Zoltan N. Oltvai, and A.-L. Barabasi, "The large-scale organization of metabolic networks," Nature 407, 6804 (2000), 651. (Year: 2000).*
Hawoong Jeong, Sean P. Mason, A.-L. Barabasi, and Zoltan N. Oltvai, "Lethality and centrality in Protein Networks," Nature 411, 6833 (2001), 41. (Year: 2001).*
Peter Eckersley, "How unique is your web browser?" in International Symposium on Privacy Enhancing Technologies, Springer, 1-19. (Year: 2010).*
Lv, F., et al., "Detecting Fraudulent Bank Account Based on Convolutional Neural Network with Heterogeneous Data," Mathematical Problems in Engineering, 2019, Hindawi Limited. (Year: 2019).*
Bruss C.B., et al. "DeepTrax: Embedding Graphs of Financial Transactions," https://arxiv.org/abs/1907.07225, Jul. 16, 2019 (Year: 2019).*
Zhu, C., et al., "Network Embedding-Based Anomalous Density Searching for Multi-Group Collaborative Fraudsters Detection in Social Media," CMC, vol. 60, No. 1, pp. 317-333, 2019. (Year: 2019).*
Hermsen, F.A.W., "End-to-End Learning from Complex Multigraphs with Latent-Graph Convolutional Networks," https://arxiv.org/abs//1908.05365, Jan. 24, 2021. (Year: 2021).*
Nesreen K Ahmed, Ryan A Rossi, Rong Zhou, John Boaz Lee, Xiangnan Kong, Theodore L Willke, and Hoda Eldardiry. 2017. Inductive representation learning in large attributed graphs. arXiv preprint arXiv:1710.09471 (2017).
Réka Albert, Hawoong Jeong, and Albert-László Barabási. 1999. Internet: Diameter of the world-wide web. nature 401, 6749 (1999), 130.
Yoshua Bengio, Jérôme Louradour, Ronan Collobert, and Jason Weston. 2009. Curriculum learning. In Proceedings of the 26th annual international conference on machine learning. ACM, 41-48.
Andrei Broder, Ravi Kumar, Farzin Maghoul, Prabhakar Raghavan, Sridhar Rajagopalan, Raymie Stata, Andrew Tomkins, and Janet Wiener. 2000. Graph structure in the web. Computer networks 33, 1-6 (2000), 309-320.
Joan Bruna, Wojciech Zaremba, Arthur Szlam, and Yann LeCun. 2013. Spectral networks and locally connected networks on graphs. arXiv preprint arXiv:1312.6203 (2013).
Juan Camacho, Roger Guimerà, and Luís A Nunes Amaral. 2002. Robust patterns in food web structure. Physical Review Letters 88, 22 (2002), 228102.
Shaosheng Cao, Wei Lu, and Qiongkai Xu. 2015. Grarep: Learning graph representations with global structural information. In Proceedings of the 24th ACM international on conference on information and knowledge management. ACM, 891-900.
Sandro Cavallari, Vincent W Zheng, Hongyun Cai, Kevin Chen-Chuan Chang, and Erik Cambria. 2017. Learning community embedding with community detection and node embedding on graphs. In Proceedings of the 2017 ACM on Conference on Information and Knowledge Management. ACM, 377-386.
William W Cohen and Jacob Richman. 2002. Learning to match and cluster large high-dimensional data sets for data integration. In Proceedings of the eighth ACM SIGKDD international conference on Knowledge discovery and data mining. ACM, 475-480.
Anirban Dasgupta, Maxim Gurevich, Liang Zhang, Belle Tseng, and Achint O Thomas. 2012. Overcoming browser cookie churn with clustering. In Proceedings of the fifth ACM international conference on Web search and data mining. ACM, 83-92.
Jennifer A Dunne, Richard J Williams, and Neo D Martinez. 2002. Food-web structure and network theory: the role of connectance and size. Proceedings of the National Academy of Sciences 99, 20 (2002), 12917-12922.
Gamaleldin Elsayed, Dilip Krishnan, Hossein Mobahi, Kevin Regan, and Samy Bengio. 2018. Large margin deep networks for classification. In Advances in neural information processing systems. 842-852.
Michalis Faloutsos, Petros Faloutsos, and Christos Faloutsos.1999. On power-law relationships of the internet topology. In ACM SIGCOMM computer communication review, vol. 29. ACM, 251-262.
Lise Getoor and Ashwin Machanavajjhala. 2013. Entity resolution for big data. In Proceedings of the 19th ACM SIGKDD international conference on Knowledge discovery and data mining. ACM, 1527-1527.
Aditya Grover and Jure Leskovec. 2016. node2vec: Scalable feature learning for networks. In Proceedings of the 22nd ACM SIGKDD international conference on Knowledge discovery and data mining. ACM, 855-864.
Will Hamilton, Zhitao Ying, and Jure Leskovec. 2017. Inductive representation learning on large graphs. In Advances in Neural Information Processing Systems. 1024-1034.
Di Jin, Mark Heimann, Ryan A. Rossi, and Danai Koutra. 2019. Node2BITS: Compact Time- and Attribute-aware Node Representations for User Stitching. In ECML/PKDD. 22.
Sungchul Kim, Nikhil Kini, Jay Pujara, Eunyee Koh, and Lise Getoor. 2017. Probabilistic visitor stitching on cross-device web logs. In Proceedings of the 26th International Conference on World Wide Web. International World Wide Web Conferences Steering Committee, 1581-1589.
Thomas N Kipf and Max Welling. 2016. Semi-supervised classification with graph convolutional networks. arXiv preprint arXiv:1609.02907 (2016).
Valdis E Krebs. 2002. Mapping networks of terrorist cells. Connections 24, 3 (2002), 43-52.
Linyuan Lü and Tao Zhou. 2011. Link prediction in complex networks: A survey. Physica A: statistical mechanics and its applications 390, 6 (2011), 1150-1170.
Sergei Maslov and Kim Sneppen. 2002. Specificity and stability in topology of protein networks. Science 296, 5569 (2002), 910-913.
Robert M May and Alun L Lloyd. 2001. Infection dynamics on scale-free networks. Physical Review E 64, 6 (2001), 066112.
Amy McGovern, Lisa Friedland, Michael Hay, Brian Gallagher, Andrew Fast, Jennifer Neville, and David Jensen. 2003. Exploiting relational structure to understand publication patterns in high-energy physics. SIGKDD Explorations 5, 2 (2003), 165-172.
Cristopher Moore and Mark EJ Newman. 2000. Epidemics and percolation in small-world networks. Physical Review E 61, 5 (2000), 5678.
Jennifer Neville, Özgür Şimşek, David Jensen, John Komoroske, Kelly Palmer, and Henry Goldberg. 2005. Using relational knowledge discovery to prevent securities fraud. In Proceedings of the eleventh ACM SIGKDD international conference on Knowledge discovery in data mining. ACM, 449-458.
Mark EJ Newman. 2001. The structure of scientific collaboration networks. Proceedings of the national academy of sciences 98, 2 (2001), 404-409.
Giang Hoang Nguyen, John Boaz Lee, Ryan A Rossi, Nesreen K Ahmed, Eunyee Koh, and Sungchul Kim. 2018. Continuous-time dynamic network embeddings. In Companion Proceedings of the The Web Conference 2018. International World Wide Web Conferences Steering Committee, 969-976.
Romualdo Pastor-Satorras and Alessandro Vespignani. 2001. Epidemic spreading 883 in scale-free networks. Physical review letters 86, 14 (2001), 3200.
Bryan Perozzi, Rami Al-Rfou, and Steven Skiena. 2014. Deepwalk: Online learning of social representations. In Proceedings of the 20th ACM SIGKDD international conference on Knowledge discovery and data mining. ACM, 701-710.
Leonardo FR Ribeiro, Pedro HP Saverese, and Daniel R Figueiredo. 2017. struc2vec: Learning node representations from structural identity. In Proceedings of the 23rd ACM SIGKDD International Conference on Knowledge Discovery and Data Mining. ACM, 385-394.
Ryan Rossi and Nesreen Ahmed. 2015. The network data repository with interactive graph analytics and visualization. In Twenty-Ninth AAAI Conference on Artificial Intelligence.
Ryan Rossi and Jennifer Neville. 2010. Modeling the evolution of discussion topics and communication to improve relational classification. In Proceedings of the First Workshop on Social Media Analytics. ACM, 89-97.

(56) References Cited

OTHER PUBLICATIONS

Rishiraj Saha Roy, Ritwik Sinha, Niyati Chhaya, and Shiv Saini. 2015. Probabilistic deduplication of anonymous web traffic. In Proceedings of the 24th International Conference on World Wide Web. ACM, 103-104.
Jian Tang, Meng Qu, Mingzhe Wang, Ming Zhang, Jun Yan, and Qiaozhu Mei. 2015. Line: Large-scale information network embedding. In Proceedings of the 24th international conference on world wide web. International World Wide Web Conferences Steering Committee, 1067-1077.
Andreas Wagner and David A Fell. 2001. The small world inside large metabolic networks. Proceedings of the Royal Society of London. Series B: Biological Sciences 268, 1478 (2001), 1803-1810.
Duncan J Watts and Steven H Strogatz. 1998. Collective dynamics of 'small- world' networks. *nature* 393, 6684 (1998), 440.
Rex Ying, Ruining He, Kaifeng Chen, Pong Eksombatchai, William L Hamilton, and Jure Leskovec. 2018. Graph convolutional neural networks for web-scale recommender systems. In Proceedings of the 24th ACM SIGKDD International Conference on Knowledge Discovery & Data Mining. ACM, 974-983.
Mikhail Belkin and Partha Niyogi. 2002. Laplacian Eigenmaps for Dimensionality Reduction and Data Representation. Neural Computation 15 (2002), 1373-1396.
Amr Ahmed, Nino Shervashidze, Shravan Narayanamurthy, Vanja Josifovski, and Alexander S. Smola. 2013. Distributed large-scale natural graph factorization. In WWW. 37-48.

\* cited by examiner

US 11,403,643 B2

UTILIZING A TIME-DEPENDENT GRAPH CONVOLUTIONAL NEURAL NETWORK FOR FRAUDULENT TRANSACTION IDENTIFICATION

BACKGROUND

Recent years have seen significant improvements in hardware and software platforms that allow for digital transactions. For example, electronic commerce platforms (e.g., online retail sites) provide convenience with which users can purchase products or services by entering payment information using a computing device, such as a desktop or smartphone. Unfortunately, fraudsters often attempt to exploit electronic commerce platforms—especially those offering an option (e.g., guest checkout) where the user does not have to log into a user account.

SUMMARY

One or more embodiments described herein provide benefits in the art with systems, methods, and non-transitory computer-readable media that utilize a time-dependent graph convolutional neural network to perform accurate entity resolution for fraudulent transaction identification. For example, in one or more embodiments, a system models interactions between various digital identities (e.g., email addresses, etc.) using a heterogenous network (e.g., a graph) where the nodes correspond to the digital identities and the edges correspond to digital transactions. The system can utilize a graph convolutional neural network to generate, for the nodes, node embeddings that capture the attributes and temporal long-range dependencies of the corresponding digital identities. Based on the node embeddings, the graph convolutional neural network can predict whether two digital identities correspond to the same user. Accordingly, the system can use the predictions of the graph convolutional neural network to identify fraudulent digital identities. In this manner, the system can flexibly and accurately determine whether a particular digital identity is associated with fraudulent transactions based on the transactional activities of digital identities over time.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
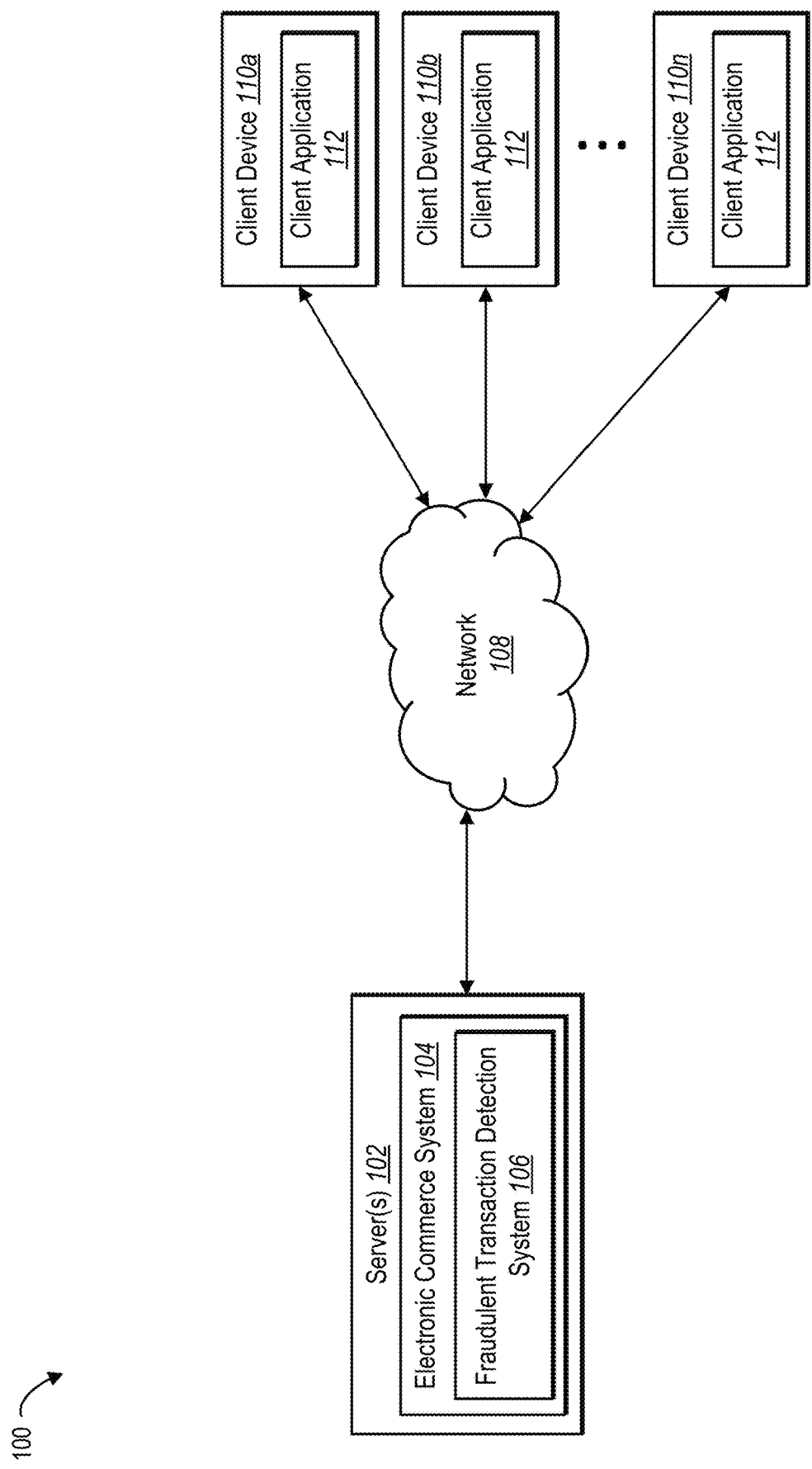
FIG. 1 illustrates an example system in which a fraudulent transaction detection system can operate in accordance with one or more embodiments.

One or more embodiments described herein include a fraudulent transaction detection system that accurately determines whether a digital identity is associated with a fraudulent transaction utilizing time-based node embeddings generated by a graph convolutional neural network. For example, in one or more embodiments, the fraudulent transaction detection system generates a heterogenous network (e.g., a graph) that includes nodes corresponding to digital identities (e.g., email addresses, etc.) and edges representing associated digital transactions. The system can utilize a graph convolutional neural network to analyze the heterogenous network and predict whether a pair of the digital identities correspond to the same user. To illustrate, the graph convolutional neural network can utilize temporal random walks for graph convolutions to generate node embeddings corresponding to the nodes based on the temporal evolution of the heterogenous network. In some embodiments, the graph convolutional neural network generates the node embeddings further based on the identity attributes of the corresponding digital identities. Based on the node embeddings, the graph convolutional neural network can predict whether two digital identities correspond to the same user and further determine whether one of the digital identities is associated with a fraudulent transaction.

To provide an example, in one or more embodiments, the fraudulent transaction detection system identifies a plurality of digital identities corresponding to a plurality of digital transactions. The fraudulent transaction detection system can generate a transaction graph that includes edge connections between a plurality of nodes that correspond to the plurality of digital identities. The fraudulent transaction detection system can analyze the transaction graph utilizing a time-dependent graph convolutional neural network. For example, the time-dependent graph convolutional neural network can generate, based on the edge connections of the transaction graph, node embeddings corresponding to the plurality of nodes utilizing a plurality of temporal random walks. Based on the node embeddings, the time-dependent graph convolutional neural network can generate a similarity probability for a pair of digital identities from the plurality of digital identities. The fraudulent transaction detection system can determine that a digital identity from the pair of digital identities corresponds to a fraudulent transaction based on the similarity probability.

As just mentioned, in one or more embodiments, the fraudulent transaction detection system generates a transaction graph that includes a plurality of nodes corresponding to a plurality of digital identities. Indeed, in one or more embodiments, a node from the transaction graph corresponds to a particular digital identity that has engaged in a digital transaction. Further, in some embodiments, the transaction graph is heterogenous, including nodes that correspond to digital identities of various types (e.g., one node corresponds to an email address, another node corresponds to a credit card identifier, etc.).

The fraudulent transaction detection system can further record (e.g., generate) a plurality of edge connections between the plurality of nodes. In one or more embodiments, an edge connection between a pair of nodes corresponds to a digital transaction associated with (i.e., engaged in by) the digital identities represented by those nodes. In some embodiments, the fraudulent transaction detection system 106 associates a transaction timestamp for a digital transaction with the corresponding edge connection.

In one or more embodiments, the fraudulent transaction detection system modifies the transaction graph over time. For example, as a new digital identity that is not already represented within the transaction graph engages in a new digital transaction, the fraudulent transaction detection system can modify the transaction graph by adding, to the transaction graph, a node corresponding to the new digital identity. The fraudulent transaction detection system can further add an edge connection corresponding to the new digital transaction.

As also mentioned, in one or more embodiments, the fraudulent transaction detection system utilizes a time-dependent graph convolutional neural network to generate node embeddings based on the edge connections of the transaction graph. For example, the time-dependent graph convolutional neural network can utilize a plurality of temporal random walks to identify neighbor nodes associated with a given node. Indeed, the time-dependent graph convolutional neural network can perform the temporal random walks based on the transaction timestamps associated with the edge connections. Based on prior neural network layer node embeddings of the identified neighbor nodes, the time-dependent graph convolutional neural network can generate a node embedding for the given node. In one or more embodiments, the time-dependent graph convolutional neural network generates the prior neural network layer node embeddings based on the identity attributes of a set of nodes associated with the neighbor nodes.

In one or more embodiments, based on the node embeddings, the time-dependent graph convolutional neural network generates a similarity probability for a pair of digital identities. In particular, the time-dependent graph convolutional neural network can generate the similarity probability based on the node embeddings of the pair of nodes that represent the pair of digital identities. In one or more embodiments, the time-dependent graph convolutional neural network utilizes a binary classifier to generate the similarity probability.

As further mentioned, in one or more embodiments, the fraudulent transaction detection system determines whether a digital identity is associated with a fraudulent transaction. Indeed, using a similarity probability between a pair of digital identities generated by the time-dependent graph convolutional neural network, the fraudulent transaction detection system can determine that a digital identity from the pair of digital identities is associated with a fraudulent entity (e.g., a fraudulent user). More particularly, knowing a given node is associated with a fraudulent transaction or entity, the fraudulent transaction detection system can compare other nodes to the given node using similarity scores to determine if the other nodes are the same entity as the given node. Accordingly, the fraudulent transaction detection system can determine that a digital transaction associated with that digital identity is a fraudulent transaction.

Conventional fraud detection systems can seek to flag possible fraudulent transactions. For instance, a conventional fraud detection system may track digital identities (e.g., email addresses, credit card identifiers, etc.) associated with digital transactions and determine whether certain digital identities originate from the same user. Conventional fraud detection systems; however, suffer from several technological shortcomings that result in inaccurate, inflexible, and inefficient operations. For example, conventional fraud detection systems often fail to accurately determine whether digital identities originate from the same user. To illustrate, conventional fraud detection systems may utilize a continuous-time dynamic network embedding (CTDNE) model that generates embeddings corresponding to the digital identities and then determines the similarities between the embeddings. The CTDNE model, however, does not consider attributes of a digital identity when generating the corresponding embedding; thus, the embedding generally provides an inaccurate representation of the digital identity. As a result, the conventional fraud detection systems may inaccurately identify that two digital identities originate from the same user.

In addition to accuracy concerns, conventional fraud detection systems are also inflexible. In particular, conventional fraud detection systems are often inflexible in that the models they use are not inductive. For example, as mentioned above, some conventional fraud detection systems utilize a CTDNE model to generate embeddings for a set of digital identities. However, the CTDNE model can typically only generate embeddings for a set of digital identities for which the model was trained to analyze. Thus, such conventional systems often fail to flexibly accommodate changes to the set of digital identities being analyzed, such as when a new digital identity initiates a new digital transaction.

In addition to problems with inaccuracy and inflexibility, conventional fraud detection systems are also inefficient. Indeed, because the models often used for analyzing a set of digital identities generally fail to accommodate changes to the set (e.g., fail to incorporate inductive capabilities), conventional fraud detection systems typically must re-train the models when the set of digital identities changes. Accordingly, such conventional systems often require a significant amount of computing resources to retrain these models.

The fraudulent transaction detection system provides several advantages over conventional systems, such as those just mentioned. For example, the fraudulent transaction detection system can operate more accurately than conventional systems. In particular, by generating node embeddings based on the identity attributes of the digital identities, the fraudulent transaction detection system utilizes a greater amount of available information than some conventional systems. Accordingly, the node embeddings provide a more wholistic representation of the digital identities, and the fraudulent transaction detection system can more accurately determine whether digital identities originate from the same entity (e.g., user), resulting in more accurate fraud detection.

Further, the fraudulent transaction detection system improves flexibility. For example, because the fraudulent transaction detection system utilizes a time-dependent graph convolutional neural network to analyze transaction graphs, the fraudulent transaction detection system can implement inductive capabilities to analyze changes to transaction graphs as well. Indeed, the time-dependent graph convolutional neural network shares learned neural network parameters when generating node embeddings, allowing the use of a previously-learned neural network parameter when generating a node embedding for a node that was added to the transaction graph after the training phase. Accordingly, the fraudulent transaction detection system can more flexibly accommodate changes to the set of digital identities being analyzed.

Additionally, the fraudulent transaction detection system can operate more efficiently than conventional systems. Indeed, because the fraudulent transaction detection system utilizes a time-dependent graph convolutional neural network that can implement inductive capabilities, the fraudulent transaction detection system avoids the need to retrain the time-dependent graph convolutional neural network whenever a change to the transaction graph occurs. Accordingly, the fraudulent transaction detection system reduces the amount of computing resources used to train and implement the time-dependent graph convolutional neural network.

As illustrated by the foregoing discussion, the present disclosure utilizes a variety of terms to describe features and benefits of the image composition system. Additional detail is now provided regarding the meaning of these terms. For example, as used herein, the term "digital identity" refers to a digital identifier associated with an entity. In particular, a digital identity can refer to digital data (e.g., one or more letters, numbers, and/or other characters) that identifies or is otherwise associated with an external agent, such as a user or a computing device. For example, a digital identity can include, but is not limited to, an email address, a credit card identifier, a debit card identifier, an IP address, or a device identifier. As such, a single entity can have many associated digital identities.

Relatedly, as used herein, the term "identity attribute" refers to data associated with a digital identity. In particular, an identity attribute can refer to a characteristic of a digital identity, an activity performed in association with the digital identity, and/or details related to the activity. For example, an identity attribute can include a geo-location associated with a digital identity, an email address domain, or a type of IP address. In one or more embodiments, an identity attribute includes a characteristic or detail of one or more digital transactions associated with the corresponding digital identity. To illustrate, an identity attribute can include a product name, a product amount, a transaction time, or a number of digital transactions associated with the corresponding digital identity.

Additionally, as used herein, the term "digital transaction" refers to a transfer of money or other asset via electronic means. In particular, a digital transaction can refer to a transaction in which money or some other asset is electronically withdrawn from one financial account and deposited into another financial account. In some embodiments, a digital transaction relates to the electronic transfer of money or some other asset in exchange for a product or service. For example, a digital transaction can include payment for a product or service through a website or native computing application. In some embodiments, a digital transaction includes a zero dollar authentication transaction in which a payment instrument (e.g., a debit card or credit card) is verified (e.g., for use of the payment instrument to transfer money at a later time).

As used herein, the term "transaction timestamp" refers to a time associated with a digital transaction. In particular, a transaction timestamp can refer to a time in which a digital transaction was submitted for execution. The fraudulent transaction detection system can represent a transaction timestamp at various levels by including the year, month, day, and/or time of day. The fraudulent transaction detection system can further represent a transaction timestamp using a local time zone (e.g., the time zone associated with the user initiating the digital transaction) or a globally-recognized time zone (e.g., Greenwich Mean Time).

Further, as used herein, the term "fraudulent transaction" refers to an unauthorized digital transaction. In particular, a fraudulent transaction can refer to a digital transaction initiated by an entity (e.g., a person) without authorization from the owner of the money or other asset to be transferred. For example, a fraudulent transaction can include payment for a product or service using a stolen or lost credit card or debit card through a website. In one or more embodiments, a fraudulent transaction includes in instance of trial abuse in which a user creates multiple entities (e.g., email addresses) for use in obtaining multiple free trials of a product or service.

As used herein, the term "transaction graph" refers to a graph representing digital transactions. In particular, a transaction graph can refer to an organization of nodes where each node corresponds to a digital identity that is associated with (e.g., has engaged in) at least one digital transaction and each edge connection corresponds to a digital transaction. In particular, as used herein, the term "edge connection" (or "edge") refers to an association between nodes. In particular, an edge connection refers to a link or connection between one node and another node within a transaction graph. Thus, an edge connection can indicate that the digital identities corresponding to the connected nodes are associated with the digital transaction corresponding to the edge connection.

Further, as used herein, the term "neighbor node" refers to a node that is associated with a given node within a transaction graph. In particular, a neighbor node can refer to a node that is associated with a given node based on one or more temporal dependencies represented within a transaction graph. Indeed, a neighbor node can include a node that is directly connected to the given node within the transaction graph but is not so limited. A neighbor node can also include a node that is not directly connected to the given node but is still associated with the given node. Determining the neighbor nodes associated with a given node will be explained in more detail below.

As used herein, the term "time-dependent graph convolutional neural network" refers to a computer algorithm or model that generates similarity probabilities for pairs of digital identities. In particular, a time-dependent graph convolutional neural network can refer to a computer algorithm that analyzes a transaction graph and generates a similarity probability for a pair of digital identities represented therein based on the temporal evolution of the transaction graph. For example, a time-dependent graph convolutional neural network can include a neural network, such as a graph convolutional neural network.

Additionally, as used herein, the term "neural network" refers to a machine learning model that can be tuned (e.g., trained) based on inputs to approximate unknown functions. In particular, the term neural network can include a model of interconnected artificial neurons (e.g., organized in layers) that communicate and learn to approximate complex functions and generate outputs based on a plurality of inputs provided to the model. For instance, the term neural network includes one or more machine learning algorithms. In addition, a neural network can refer to an algorithm (or set of algorithms) that implements deep learning techniques that utilize a set of algorithms to model high-level abstractions in data. To illustrate, a neural network can include a convolutional neural network, a recurrent neural network, a generative adversarial neural network, and/or a graph neural network (e.g., a graph convolutional neural network).

Additionally, as used herein, the term "temporal random walk" refers to a process for traversing a network (e.g., a graph) that includes a plurality of interconnected nodes. In particular, a temporal random walk can refer to a process of traversing the nodes of a graph in a random or semi-random manner, where traversal from one node to an adjacent node (e.g., a connected node) is allowed or disallowed based on a time element associated with the nodes. For example, a temporal random walk can include a process of traversing a transaction graph to identify neighbor nodes associated with a given node based on the transaction timestamps associated with the edge connections of the transaction graph.

Further, as used herein, the term "node embedding" refers to a representation of a node. In particular, a node embedding can refer to a value or a vector of values that are associated with a node and can be used by a model to generate a subsequent value (e.g., an output, such as a similarity probability). For example, a node embedding can include a value or vector of values, representing a digital identity that corresponds to a node, generated based on the node embeddings of the neighbor nodes associated with that node. In one or more embodiments, a node embedding for a given node includes (e.g., captures) one or more identity attributes associated with the digital identity represented by that node.

As used herein, the term "similarity probability" refers to a metric that measures the likeness between two or more digital identities. In particular, a similarity probability can refer to a metric (e.g., a similarity score) that measures the similarity between node embeddings corresponding to the nodes that represent digital identities within a transaction graph. In one or more embodiments, the similarity probability indicates the likelihood that the digital identities are associated with (e.g., originate from) the same user or entity.

Additional detail regarding the fraudulent transaction detection system will now be provided with reference to the figures. For example, FIG. 1 illustrates a schematic diagram of an exemplary system 100 in which a fraudulent transaction detection system 106 can be implemented. As illustrated in FIG. 1, the system 100 can include a server(s) 102, a network 108, and client devices 110a-110n.

Although the system 100 of FIG. 1 is depicted as having a particular number of components, the system 100 can have any number of additional or alternative components (e.g., any number of servers, client devices, or other components in communication with the fraudulent transaction detection system 106 via the network 108). Similarly, although FIG. 1 illustrates a particular arrangement of the server(s) 102, the network 108, and the client devices 110a-110n, various additional arrangements are possible.

The server(s) 102, the network 108, and the client devices 110a-110n may be communicatively coupled with each other either directly or indirectly (e.g., through the network 108 discussed in greater detail below in relation to FIG. 10). Moreover, the server(s) 102 and the client devices 110a-110n may include a variety of computing devices (including one or more computing devices as discussed in greater detail with relation to FIG. 10).

As mentioned above, the system 100 includes the server(s) 102. The server(s) 102 can generate, store, receive, and/or transmit data, including data regarding digital transactions. For example, the server(s) 102 can receive payment information related to payment of a product or service from one or more client devices (e.g., one or more of the client devices 110a-110n). The server(s) 102 can further receive information related to digital identities associated with digital transactions.

As shown in FIG. 1, the server(s) 102 can include an electronic commerce system 104. In particular, the electronic commerce system 104 can display information for and/or process digital transactions related to products and/or services. For example, a client device (e.g., one of the client devices 110a-110n) can request access to an online retail website (e.g., hosted on the server(s) 102) via the network 108. In response to determining that the client device has requested access, the electronic commerce system 104 can provide a graphical user interface and options that a user of the client device can use to search for, view, and/or review products and/or services offered through the online retail website. The electronic commerce system 104 can further provide options that a user can use to initiate a digital transaction (e.g., by entering and submitting payment information) regarding one or more of the products and/or services. Upon the user initiating the digital transaction, the electronic commerce system 104 can process the digital transaction (e.g., verify the digital transaction, execute the digital transaction, etc.).

Additionally, the server(s) 102 can include the fraudulent transaction detection system 106. In particular, in one or more embodiments, the fraudulent transaction detection system 106 utilizes the server(s) 102 to identify digital identities that correspond to fraudulent transactions. For example, the fraudulent transaction detection system 106 can utilize the server(s) 102 to identify a plurality of digital identities corresponding to a plurality of digital transactions and determine whether a given digital identity corresponds to a fraudulent transaction.

For example, in one or more embodiments, the fraudulent transaction detection system 106, via the server(s) 102, identifies a plurality of digital identities corresponding to a plurality of digital transactions. The fraudulent transaction detection system 106 can, via the server(s) 102, generate a transaction map that includes edge connections between a plurality of nodes that correspond to the plurality of digital identities. Via the server(s) 102, the fraudulent transaction detection system 106 can utilize a time-dependent graph convolutional neural network to generate, based on the edge connections of the transaction graph, node embeddings corresponding to the plurality of nodes utilizing a plurality of temporal random walks. The fraudulent transaction detection system 106 can further utilize the time-dependent graph convolutional neural network to generate a similarity probability (e.g., a similarity score) for a pair of digital identities based on the node embeddings. Via the server(s) 102, the fraudulent transaction detection system 106 can determine that a digital identity from the pair of digital identities corresponds to a fraudulent transaction based on the similarity probability (e.g., the similarity score).

In one or more embodiments, the client devices 110a-110n include computing devices that can initiate digital transactions related to products and/or services. For example, the client devices 110a-110n can include smartphones, tablets, desktop computers, laptop computers, head-mounted-display devices, or other electronic devices. The client devices 110a-110n can include one or more applications (e.g., the client application 112) that can initiate digital transactions related to products and/or services. For example, the client application 112 can include a software application installed on the client devices 110a-110n. Additionally, or alternatively, the client application 112 can include a software application hosted on the server(s) 102, which may be accessed by the client devices 110a-110n through another application, such as a web browser.

The fraudulent transaction detection system 106 can be implemented in whole, or in part, by the individual elements of the system 100. Indeed, although FIG. 1 illustrates the fraudulent transaction detection system 106 implemented with regard to the server(s) 102, different components of the fraudulent transaction detection system 106 can be implemented in a variety of the components of the system 100. For example, one or more components of the fraudulent transaction detection system 106—including all components of the fraudulent transaction detection system 106—can be implemented by a separate server from the server(s) 102 hosting the electronic commerce system 104. Example components of the fraudulent transaction detection system 106 will be discussed in more detail below with regard to FIG. 8.

Figure 2:
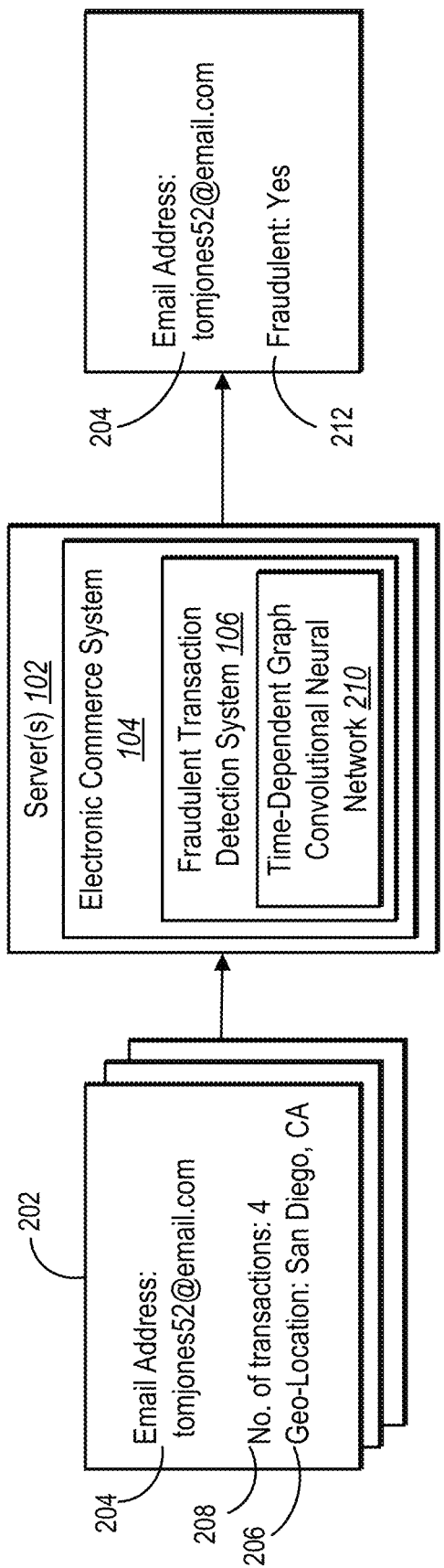
FIG. 2 illustrates a block diagram of the fraudulent transaction detection system determining that a digital identity is associated with a fraudulent transaction in accordance with one or more embodiments.

As mentioned above, the fraudulent transaction detection system 106 can determine that a digital identity corresponds to a fraudulent transaction. FIG. 2 illustrates a block diagram of the fraudulent transaction detection system 106 determining that a digital identity corresponds to a fraudulent transaction in accordance with one or more embodiments.

As shown in FIG. 2, the fraudulent transaction detection system 106 identifies a plurality of digital identities 202. In one or more embodiments, the fraudulent transaction detection system 106 identifies the plurality of digital identities 202 by receiving the plurality of digital identities 202 from an external source, such as a client device. For example, the fraudulent transaction detection system 106 can receive a given digital identity in association with a digital transaction initiated by that digital identity via a client device. In some embodiments, the fraudulent transaction detection system 106 identifies one or more of the digital identities from the plurality of digital identities 202 from a database storing digital identities and corresponding digital transactions. In still further embodiments, the fraudulent transaction detection system 106 identifies one or more digital identities from the plurality of digital identities by monitoring digital transactions initiated on a third-party system. Indeed, the fraudulent transaction detection system 106 can monitor a third-party system, detect a digital transaction submitted thereat, and identify the corresponding digital identity.

As shown in FIG. 2, one or more digital identities from the plurality of digital identities 202 are associated with identity attributes. Indeed, in one or more embodiments, upon identifying a particular digital identity, the fraudulent transaction detection system 106 identifies one or more associated identity attributes. In some embodiments, the fraudulent transaction detection system 106 identifies an identity attribute by receiving the identity attribute in association with a digital transaction initiated by the digital identity. To illustrate, upon receiving a digital transaction corresponding to the digital identity 204, the fraudulent transaction detection system 106 can receive a geo-location 206 associated with the digital identity 204. It should be noted that, although FIG. 2 illustrates the geo-location 206 providing the name of a city, the geo-location can include various other scopes of location (e.g., a country, a state, a street, a specific address, etc.).

In some embodiments, the fraudulent transaction detection system 106 identifies an identity attribute associated with a digital identity by tracking the identity attribute. Indeed, the fraudulent transaction detection system 106 can store an identity attribute of a corresponding digital identity and update the identity attribute upon detecting a change. As an illustration, the fraudulent transaction detection system 106 can store the number of digital transactions 208 associated with the digital identity 204 and update the number of digital transactions 208 upon identifying a subsequent digital transaction corresponding to the digital identity 204. Thus, the fraudulent transaction detection system 106 can retrieve or otherwise access the identity attribute (e.g., the value associated with the identity attribute) from storage.

As mentioned above, a given digital identity can correspond to multiple digital transactions. In some embodiments, the fraudulent transaction detection system 106 identifies identity attributes associated with the most recent digital transaction that corresponds to a digital identity (e.g., the geo-location associated with the most recent digital transaction associated with the digital identity). In some embodiments, however, the fraudulent transaction detection system 106 identifies identity attributes associated with several digital transactions that correspond to the digital identity (e.g., the geo-locations associated with each digital transaction associated with the digital identity).

As illustrated in FIG. 2, the fraudulent transaction detection system 106 utilizes a time-dependent graph convolutional neural network 210 to analyze the plurality of digital identities 202. For example, in one or more embodiments, the fraudulent transaction detection system 106 can generate a transaction graph comprising edge connections between nodes corresponding to the plurality of digital identities 202 (discussed in more detail below with regard to FIG. 3). The fraudulent transaction detection system 106 can utilize the time-dependent graph convolutional neural network 210 to analyze the transaction graph. To illustrate, the fraudulent transaction detection system 106 can utilize the time-dependent graph convolutional neural network 210 to generate a similarity probability for pairs of digital identities from the plurality of digital identities 202 based on the analysis of the transaction graph (discussed in more detail below with regard to FIGS. 4A-4C).

Figure 5:
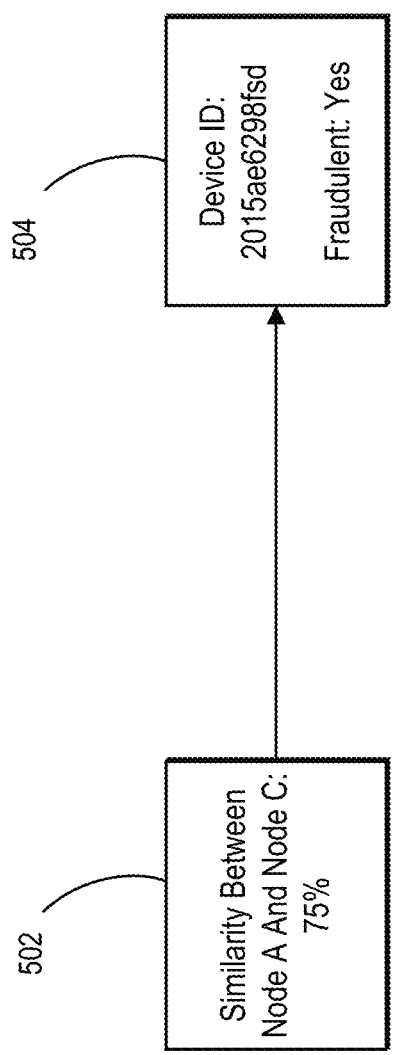
FIG. 5 illustrates a block diagram of determining that a digital identity is associated with a fraudulent transaction in accordance with one or more embodiments.

As shown in FIG. 2, based on the analysis of the plurality of digital identities 202, the fraudulent transaction detection system 106 determines whether a particular digital identity (e.g., the digital identity 204) corresponds to a fraudulent transaction (discussed in more detail below with regard to FIG. 5). In one or more embodiments, upon determining that a digital identity corresponds to a fraudulent transaction, the fraudulent transaction detection system 106 associates a fraudulent status with the digital identity (e.g., the fraudulent status 212 associated with the digital identity 204). In some embodiments, the fraudulent transaction detection system 106 transmits a notification indicating that the digital identity corresponds to a fraudulent transaction. For example, the fraudulent transaction detection system 106 can transmit a notification to an administrator or manager of the online retail website from which the fraudulent transaction originated. The fraudulent transaction detection system 106 can also transmit a notification to a device associated with the digital identity (e.g., send an email or text message to the client device of the person named on a fraudulently used credit card indicating that their credit card was used in a fraudulent transaction).

Figure 3:
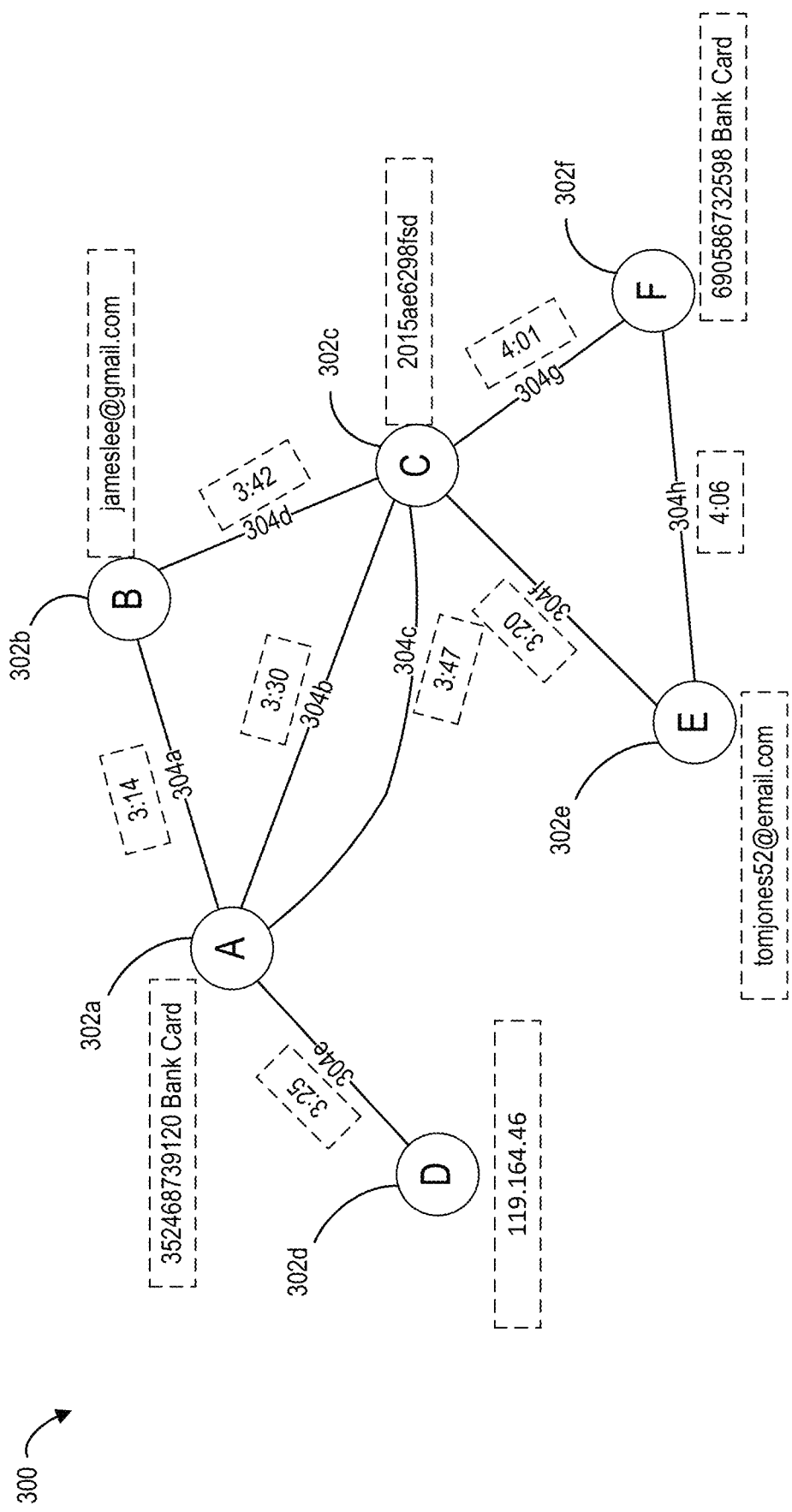
FIG. 3 illustrates a transaction graph having nodes corresponding to digital identities and edge connections corresponding to digital transactions in accordance with one or more embodiments.

As mentioned above, in one or more embodiments, the fraudulent transaction detection system 106 determines whether a given digital identity corresponds to a fraudulent transaction based on a transaction graph corresponding to a plurality of digital identities. Indeed, in one or more embodiments, the fraudulent transaction detection system 106 generates a transaction graph comprising edge connections between a plurality of nodes corresponding to the plurality of digital identities. The fraudulent transaction detection system 106 can use the transaction graph to identify digital identities that correspond to fraudulent transactions (via a time-dependent graph convolutional neural network). FIG. 3 illustrates a diagram of a transaction graph 300 corresponding to a plurality of digital identities in accordance with one or more embodiments.

As shown in FIG. 3, the fraudulent transaction detection system 106 generates the transaction graph 300 by generating the nodes 302a-302f corresponding to a plurality of digital identities (e.g., the digital identities identified as discussed above with reference to FIG. 2). Indeed, in one or more embodiments, the fraudulent transaction detection system 106 generates one node per digital identity. As further shown in FIG. 3, the fraudulent transaction detection system 106 can generate the transaction graph 300 to include nodes that correspond to a variety of different digital identity types (i.e., the transaction graph 300 can include a heterogenous network). In particular, the nodes 302a, 302f correspond to credit card identifiers; the nodes 302b, 302e correspond to email addresses; the node 302c corresponds to a device identifier; and the node 302d corresponds to an IP address.

As shown in FIG. 3, the fraudulent transaction detection system 106 can further generate the transaction graph 300 by generating the edge connections 304a-304h between the nodes 302a-302f. In one or more embodiments, the edge connections 304a-304h correspond to the digital transactions associated with the digital identities that correspond to the nodes 302a-302f. In particular, the fraudulent transaction detection system 106 can generate an edge connection between a pair of nodes that correspond to a pair of digital identities associated with the digital transaction represented by that edge connection. Indeed, in one or more embodiments, more than one digital identity corresponds to the same digital transaction. For example, a user may initiate a digital transaction by entering credit card information via a client device. The fraudulent transaction detection system 106 may then generate an edge connection corresponding to that digital transaction between a first node corresponding to a credit card identifier associated with the credit card information and a second node corresponding to a device identifier associated with the client device.

In one or more embodiments, where a set of more than two digital identities corresponds to the same digital transaction, the fraudulent transaction detection system 106 generates an edge connection corresponding to that digital transaction between pairs of nodes corresponding to each pair of digital identities from the set. Indeed, the fraudulent transaction detection system 106 can generate the transaction graph 300 to include multiple edge connections that correspond to the same digital transaction.

In some embodiments, where a pair of digital identities correspond to multiple digital transactions, the fraudulent transaction detection system 106 generates multiple edge connections between the corresponding pair of nodes (i.e., the transaction graph 300 can include a multigraph). For example, as illustrated in FIG. 3, the transaction graph 300 includes the edge connections 304b, 304c between the nodes 302a, 302c representing that the digital identities corresponding to the nodes 302a, 302c have both been involved in two of the same digital transactions.

As further shown in FIG. 3, the fraudulent transaction detection system 106 can associate transaction timestamps with the edge connections 304a-304h of the transaction graph 300. In particular, the transaction timestamp associated with a particular edge connection can indicate a time at which the corresponding digital transaction took place. In other words, the fraudulent transaction detection system 106 can define the transaction graph 300 as $G=(V, E, \psi, \xi, \tau)$ so that G includes a set of vertices V (i.e., nodes), a set of edges E (i.e., edge connections), a mapping $\psi: V \rightarrow \mathcal{T}_V$ of vertices to their types, a mapping $\xi: E \rightarrow \mathcal{T}_E$ of edges to their types, and a mapping $\tau: E \rightarrow \mathbb{R}^+$ of edges to their corresponding timestamp.

In one or more embodiments, the fraudulent transaction detection system 106 can modify the transaction graph 300 to generate a modified transaction graph. Indeed, upon identifying a new digital identity (i.e., a digital identity currently not included in the transaction graph 300), the fraudulent transaction detection system 106 can modify the transaction graph 300 by adding, to the transaction graph 300, a node corresponding to the new digital identity. Further, upon identifying a new digital transaction (e.g., a new digital transaction corresponding to a new digital identity or a new digital transaction corresponding to two or more digital identities already represented in the transaction graph), the fraudulent transaction detection system 106 can modify the transaction graph 300 by generating a new edge connection corresponding to the new digital transaction. The fraudulent transaction detection system 106 can further associate the transaction timestamp of the new transaction with the new edge connection.

As will be discussed below, the fraudulent transaction detection system 106 can utilize a time-dependent graph convolutional graph neural network to analyze the modified transaction graph without the need for retraining. Indeed, the fraudulent transaction detection system 106 can utilize a time-dependent graph convolutional graph neural network to analyze digital identities that were not represented within the transaction graph 300 at the time of training. Thus, the fraudulent transaction detection system 106 can continuously and flexibly update the transaction graph 300 to represent new digital identities and new transactions without suffering the inefficiencies caused by retraining the model used to analyze the transaction graph 300, which would be required under many conventional systems.

Figure 4A:
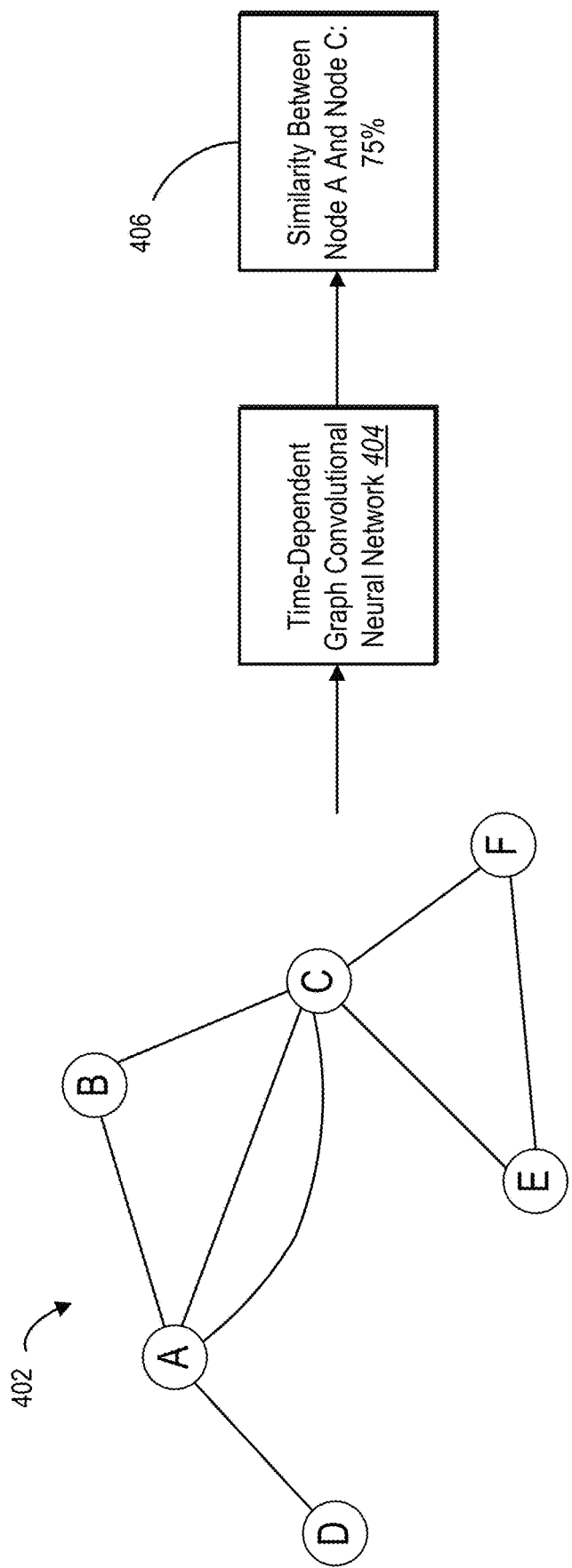
FIGS. 4A-4C illustrate diagrams of utilizing a time-dependent graph convolutional neural network to generate a similarity probability in accordance with one or more embodiments.
Figure 4B:
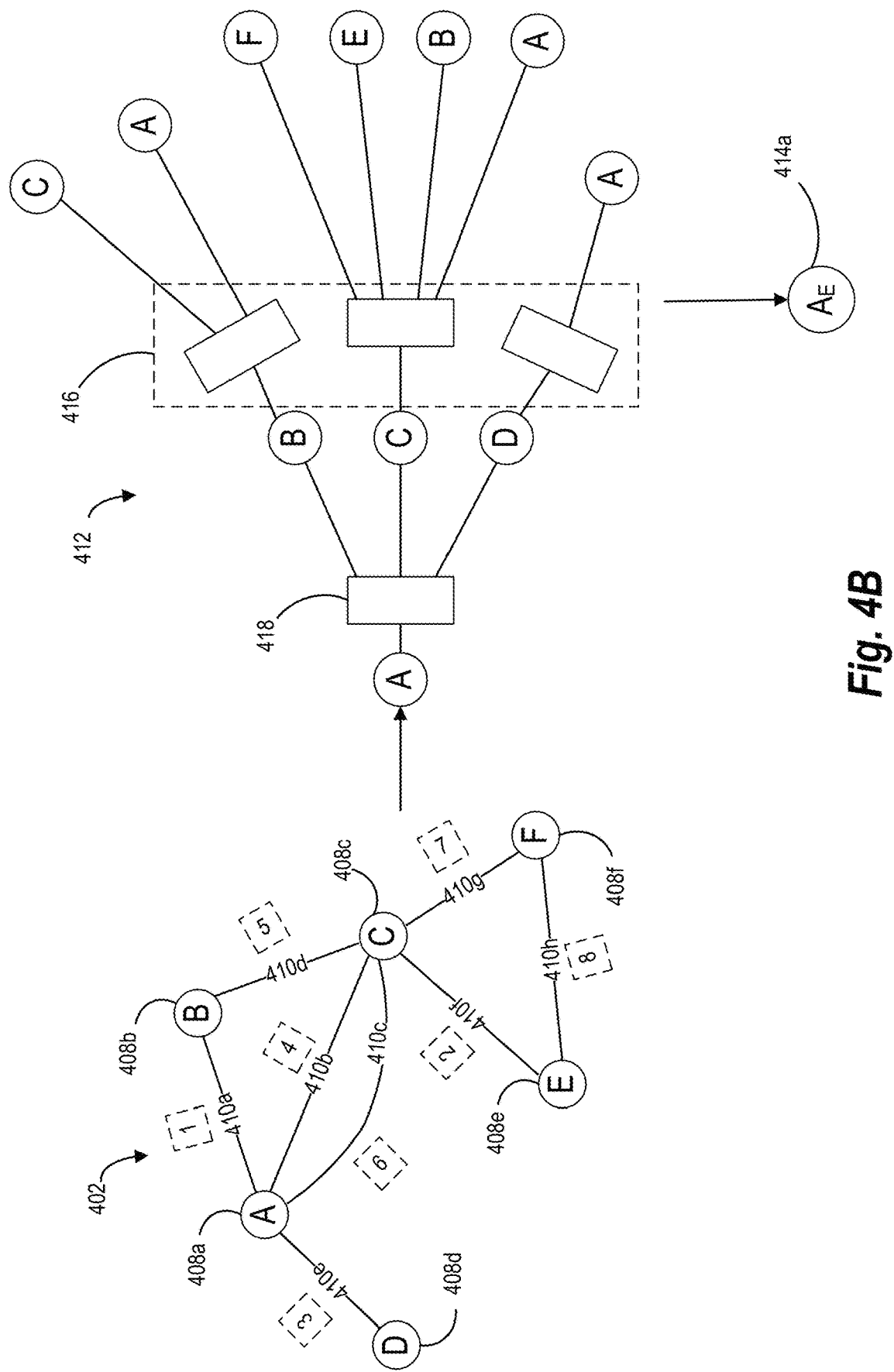
Figure 4C:
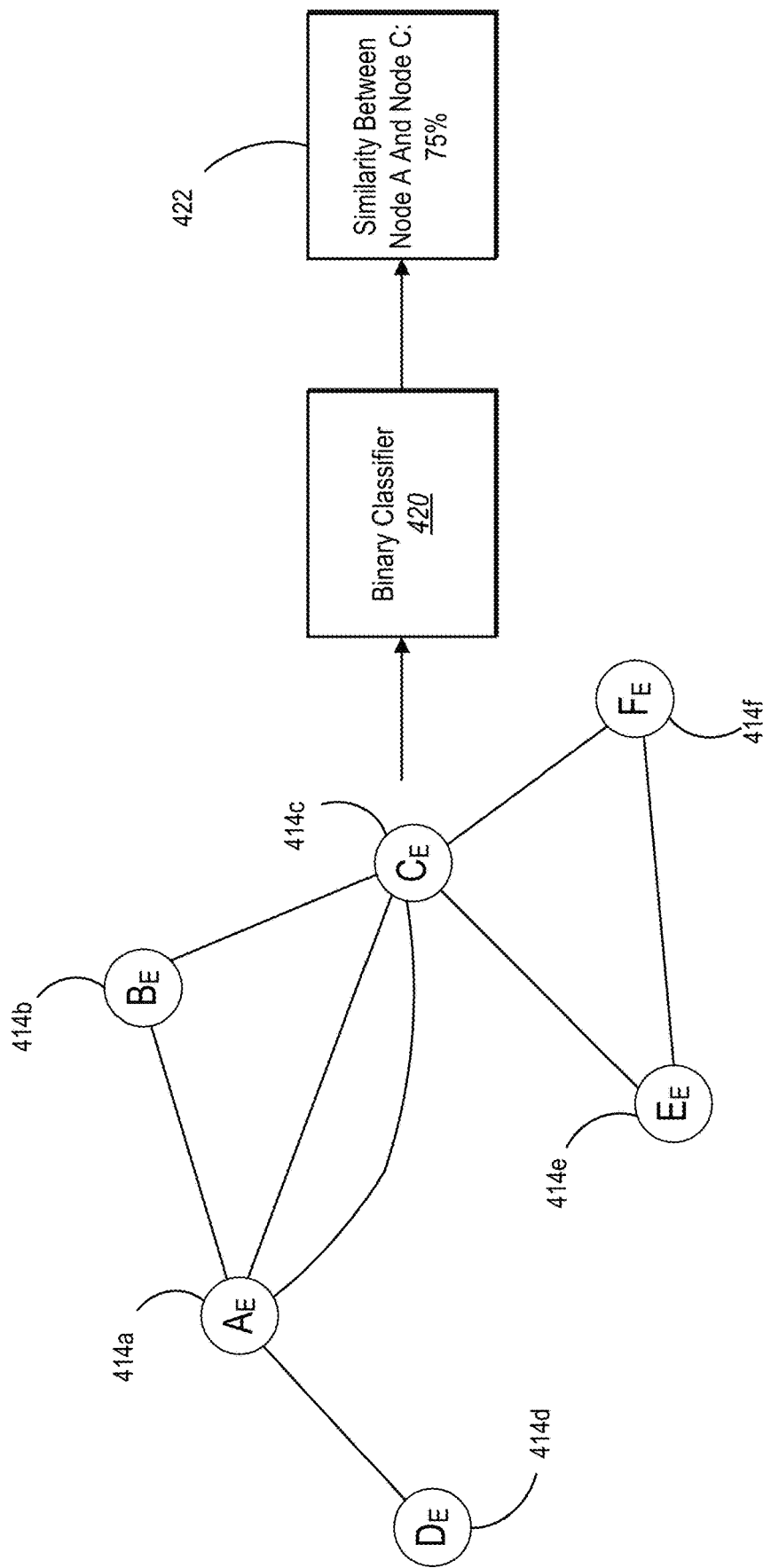

As discussed above, in one or more embodiments, the fraudulent transaction detection system 106 utilizes a time-dependent graph convolutional neural network in determining whether a digital identity is associated with a fraudulent transaction. In particular, the fraudulent transaction detection system 106 can utilize the time-dependent graph convolutional neural network to analyze a transaction graph and generate similarity probabilities between pairs of nodes included therein, which can be used for determining whether a digital identity is associated with a fraudulent transaction. FIGS. 4A-4C illustrate diagrams showing the fraudulent transaction detection system 106 utilizing a time-dependent graph convolutional neural network to analyze a transaction graph to generate a similarity probability in accordance with one or more embodiments. In particular, FIG. 4A provides an overview of using a time-dependent graph convolutional neural network to analyze a transaction graph, while FIGS. 4B-4C provide additional detail regarding how the time-dependent graph convolutional neural network generates node embeddings and similarity probabilities based on the transaction graph.

FIG. 4A illustrates a block diagram of the fraudulent transaction detection system 106 utilizing a time-dependent graph convolutional neural network 404 in accordance with one or more embodiments. Indeed, the fraudulent transaction detection system 106 can generate the transaction graph 402 by generating nodes corresponding to digital identities and generating edge connections corresponding to the transactions associated with those digital identities as discussed above with reference to FIG. 3. As shown in FIG. 4A, the fraudulent transaction detection system 106 provides the transaction graph 402 as input to the time-dependent graph convolutional neural network 404. The fraudulent transaction detection system 106 utilizes the time-dependent graph convolutional neural network 404 to analyze the transaction graph 402. Based on the analysis, the time-dependent graph convolutional neural network 404 can generate the similarity probability 406 for a pair of digital identities represented in the transaction graph 402. In particular, the similarity probability 406 provides a measure of similarity between the pair of nodes in the transaction graph 402 that correspond to the pair of digital identities.

In one or more embodiments, the time-dependent graph convolutional neural network 404 analyzes the transaction graph 402 to generate or otherwise determine node embeddings corresponding to the plurality of nodes included therein. In particular, the time-dependent graph convolutional neural network 404 can generate the node embeddings based on the edge connections of the transaction graph 402. FIG. 4B illustrates a schematic diagram of the time-dependent graph convolutional neural network 404 generating a node embedding 414a for the node 408a in accordance with one or more embodiments.

As shown in FIG. 4B, the fraudulent transaction detection system 106 generates a node embedding 414a for the node 408a by generating a computation graph 412 corresponding to the node 408a and utilizing the time-dependent graph convolutional neural network 404 to generate the node embedding 414a based on the computation graph 412. In one or more embodiments, the fraudulent transaction detection system 106 does not generate the computation graph 412; rather, the computation graph 412 is merely illustrative of how the time-dependent graph convolutional neural network 404 passes values among its neural network layers in order to generate the node embedding 414a for the node 408a. As shown in FIG. 4B, the computation graph 412 (i.e., the time-dependent graph convolutional neural network 404) includes a first neural network layer 416 and a second neural network layer 418. However, the computation graph 412 can include fewer or additional neural network layers.

In one or more embodiments, the time-dependent graph convolutional neural network 404 utilizes, as the input to a given neural network layer, prior neural network layer node embeddings (i.e., node embeddings generated by the previous neural network layer). For example, as shown in FIG. 4B, the time-dependent graph convolutional neural network 404 utilizes, as the input to the second neural network layer 418, node embeddings (e.g., generated by the first neural network layer 416) corresponding to the nodes 408b-408d. Similarly, the time-dependent graph convolutional neural network 404 utilizes, as the input to the first neural network layer 416, node embeddings corresponding to the nodes 408a-408c, 408e-408f.

In one or more embodiments, the node embeddings that make up the input to the first neural network layer 416 include the identity attributes of the digital identities corresponding to the nodes 408a-408c, 408e-408f. Thus, the time-dependent graph convolutional neural network 404 can generate the node embedding 414a for the node 408a based on the identity attributes of the plurality of digital identities represented in the transaction graph 402. More specifically, the time-dependent graph convolutional neural network 404 can generate the node embeddings corresponding to the nodes 408b-408d (which are used to generate the node embedding 414a) based on the identity attributes of the digital identities corresponding to the nodes 408a-408c, 408e-408f. By generating node embeddings based on the identity attributes of digital identities, the fraudulent transaction detection system 106 can operate more accurately than conventional systems. Indeed, the fraudulent transaction detection system 106 can generate node embeddings that more accurately represent the corresponding digital identities, leading to more accurate similarity probabilities.

In one or more embodiments, the time-dependent graph convolutional neural network 404 utilizes the node embeddings of the neighbor nodes of the node 408a as the input to the second neural network layer 418 (i.e., the nodes 408b-408d are neighbor nodes associated with the node 408a). Indeed, the fraudulent transaction detection system 106 can identify the neighbor nodes associated with the node 408a, and the time-dependent graph convolutional neural network 404 can use the corresponding node embeddings as input to the second neural network layer 418. Similarly, in some embodiments, the time-dependent graph convolutional neural network 404 utilizes the node embeddings corresponding to a set of nodes associated with the neighbor nodes (e.g., the neighbors of the neighbor nodes associated with the node 408a) as the input to the first neural network layer 416.

In one or more embodiments, the fraudulent transaction detection system 106 identifies the neighbor nodes associated with the node 408a (and identifies the set of nodes associated with the neighbor nodes) based on the edge connections 410a-410h of the transaction graph 402. Indeed, as discussed above, the edge connections 410a-410h of the transaction graph 402 can correspond to digital transactions; thus, the fraudulent transaction detection system 106 can associate transaction timestamps with the edge connections 410a-410h. Accordingly, the fraudulent transaction detection system 106 can identify the neighbor nodes associated with the node 408a (and identifies the set of nodes associated with the neighbor nodes) based on the transaction timestamps associated with the edge connections 410a-410h. It should be noted that, for simplicity purposes, FIG. 4B shows a temporal ranking associated with each of the edge connections 410a-410h of the transaction graph 402—rather than the transaction timestamps themselves—to indicate a temporal order of the digital transactions represented by the edge connections 410a-410h.

In one or more embodiments, the fraudulent transaction detection system 106 identifies the neighbor nodes associated with the node 408a (and identifies the set of nodes associated with the neighbor nodes) utilizing a plurality of temporal random walks. Indeed, in some embodiments, the fraudulent transaction detection system 106 utilizes temporal random walks to identify a set of nodes associated with the node 408a based on subsets of nodes that correspond to sequences of transactions determined based on the transaction timestamps. The fraudulent transaction detection system 106 can identify the neighbor nodes associated with the node 408a from the set of nodes identified via the temporal random walks.

To provide an illustration, the fraudulent transaction detection system 106 can perform a temporal random walk for the node 408a by beginning at the node 408a and randomly moving to (i.e., identifying) a second node that is directly connected to the node 408a (e.g., one of the nodes 408b-408d). The fraudulent transaction detection system 106 can then randomly move to a third node that is directly connected to the second node.

In one or more embodiments, the fraudulent transaction detection system 106 only moves to the third node if the digital transaction represented by the edge connection between the second node and the third node is temporally subsequent to the digital transaction represented by the edge connection between the node 408a and the second node (as determined by the corresponding transaction timestamps). For example, in one or more embodiments, the fraudulent transaction detection system 106 can move from the node 408a to the node 408b and then to the node 408c, as the edge connection 410d represents a digital transaction that occurred after the digital transaction represented by the edge connection 410a. To provide another example, in some embodiments, the fraudulent transaction detection system 106 cannot move from the node 408a to the node 408c (via the edge connection 410c) and then to the node 408b, because the edge connection 410d represents a digital transaction that occurred before the digital transaction represented by the edge connection 410c. In other words, in one or more embodiments, the fraudulent transaction detection system 106 defines a temporal random walk from node $v_1$ to node $v_k$ in a transaction graph $G=(V, E, \psi, \xi, \tau)$ as a sequence of nodes $\langle v_1, v_2, \ldots, v_k \rangle$ a such that $\langle v_i, v_{i+1} \rangle \in E$ for $1 \leq i < k$ and $\tau(v_i, v_{i+1}) \leq \tau(v_{i+1}, v_{i+2})$ for $1 \leq i \leq (k-1)$.

In one or more embodiments, the fraudulent transaction detection system 106 includes each node visited (i.e., identified) during a given temporal random walk in a subset of nodes. By visiting nodes during a temporal random walk, the fraudulent transaction detection system 106 also identifies the digital transactions associated with the digital identities represented by those nodes. Thus, the fraudulent transaction detection system 106 can utilize a temporal random walk to identify a subset of nodes that corresponds to a sequence of digital transactions determined based on the transaction timestamps of the corresponding edge connections. Accordingly, the set of nodes associated with the node 408a can include each node visited while performing temporal random walks for the node 408a (i.e., each node included in at least one of the subsets of nodes).

To speak of the approach generally, the fraudulent transaction detection system 106 can define the set of nodes associated with a node u (the set of nodes represented as $C_u^{\Delta t}$—also referred to as the temporal context of node u) at temporal distance $\Delta t$ as the collection of nodes within the graph G (i.e., the transaction graph 402) that are $\Delta t$-hops away from node u. In other words, the fraudulent transaction detection system 106 can define the set of nodes associated with the node u as follows:

$$C_u^{\Delta t} = \{v : |w_L[v] - w_L[v] - w_L[u]|\} \leq \Delta t, \forall w_L \quad (1)$$

In equation 1, $w_L$ represents a temporal random walk of length L starting from node u. The fraudulent transaction detection system 106 can vary $\Delta t$ to capture long- or short-range temporal context. In other words, fraudulent transaction detection system 106 can utilize various numbers of steps (i.e., visit/identify a various number of nodes) during a given temporal random walk. In one or more embodiments, the fraudulent transaction detection system 106 utilizes the same number of steps for each temporal random walk.

In one or more embodiments, the fraudulent transaction detection system 106 identifies the neighbor nodes associated with the node 408a from the set of nodes identified via the temporal random walks. For example, in one or more embodiments, the fraudulent transaction detection system 106 determines a visit count for each node from the set of nodes. Indeed, the fraudulent transaction detection system 106 can track the number of times a particular node is visited while performing the temporal random walks. In one or more embodiments, the fraudulent transaction detection system 106 can identify a plurality of top-visited nodes as the neighbor nodes associated with the node 408a based on the visit count for each node from the set of nodes. To provide another characterization, the fraudulent transaction detection system 106 can compute a normalized histogram of counts for the set of nodes and select the top k nodes based on their histogram values $hist_u^{\Delta t}$. The fraudulent transaction detection system 106 can identify various numbers of nodes as the top-visited nodes. In some embodiments, the fraudulent transaction detection system 106 identifies, as the neighbor nodes, nodes having a visit count that meets or exceeds a pre-determined visit count threshold.

Accordingly, the fraudulent transaction detection system 106 does not require that a node be directly connected to the node 408a to be identified as a neighbor node associated with the node 408a. Rather, the fraudulent transaction detection system 106 identifies a node as a neighbor node based on a number of occurrences (i.e., the visit count) during the temporal random walks. In one or more embodiments, the fraudulent transaction detection system 106 similarly identifies the set of nodes associated with the neighbor nodes (i.e., the neighbors of the neighbor nodes associated with the node 408a).

Based on the computation graph 412, the time-dependent graph convolutional neural network 404 can generate the node embedding 414a for the node 408a. Indeed, for a node v, the time-dependent graph convolutional neural network 404 can generate the d dimensional hidden representation $h_v \in \mathbb{R}^d$ (i.e., the node embedding for node v) at the $k^{th}$ layer via a graph convolution operation over the neighbors N(v) of node v as follows:

$$h_v^k = f(\Sigma_{u \in N(v)}(W^{k-1} h_u^{k-1} + b^{k-1})), \forall v \in V \quad (2)$$

In equation 2, $f$ represents a non-linear activation function. In one or more embodiments, the time-dependent graph convolutional neural network 404 utilizes ReLU for $f$. In some embodiments, the time-dependent graph convolutional neural network 404 utilizes another non-linear activation function, such as sigmoid or tan h. Further, $h_u^{k-1}$ represents the input to the $k^{th}$ layer.

Additionally, in equation 2, $W \in \mathbb{R}^{d \times m}$ and $b \in \mathbb{R}^d$ represent parameters that are learned through training. In one or more embodiments, the time-dependent graph convolutional neural network 404 shares parameters among computation graphs. In other words, the time-dependent graph convolutional neural network 404 can utilize the same learned parameters when determining the node embeddings for each node represented in the transaction graph 402. Accordingly, the fraudulent transaction detection system 106 can operate more flexibly than conventional systems. Indeed, by sharing learned parameters, the fraudulent transaction detection system 106 can utilize previously-learned parameters to determine embeddings for digital identities represented by nodes that have been added to the transaction graph 402 after the time-dependent graph convolutional neural network 404 has been trained. Indeed, the fraudulent transaction detection system 106 can modify the transaction graph 402 by adding new nodes corresponding to new digital identities and then utilize the time-dependent graph convolutional neural network 404 to generate node embeddings corresponding to those new nodes. Thus, the fraudulent transaction detection system 106 can more flexibly accommodate changes to the set of digital identities being analyzed.

Further, the fraudulent transaction detection system 106 can operate more efficiently than conventional systems. In particular, by sharing parameters to accommodate changes to the transaction graph 402, the fraudulent transaction detection system 106 avoids the need to retrain the time-dependent graph convolutional neural network 404 to accommodate those changes. Thus, the fraudulent transaction detection system 106 reduces the amount of computing resources required to train and implement the time-dependent graph convolutional neural network 404.

In one or more embodiments, the fraudulent transaction detection system 106 associates a weight with each of the neighbors of the node v in equation 2. Indeed, the fraudulent transaction detection system 106 can determine a weight for each neighbor node associated with the node v based on the relative importance of that neighbor node to node v. For example, the fraudulent transaction detection system 106 can, for each neighbor node associated with the node v, divide the visit count of the neighbor node by the combined visit count from all neighbor nodes associated with the node v in order to provide a normalized weight value. In one or more embodiments, the fraudulent transaction detection system 106 similarly associates a weight with each node from the set of nodes associated with the neighbor nodes.

Algorithm 1, presented below, is another characterization of how the time-dependent graph convolutional neural network 404 generates a node embedding corresponding to a given node.

---

Algorithm 1
Generate Temporal Imbedding: FORWARD

---

Input: Current representation $h_u$ of node u; temporal neighbor representations $h_v, \forall v \in C_u^{\Delta t}$; importance weight of the context $hist_u^{\Delta t}$; weighting function $f_{hist}$
Output: New representation $z_u$ for node u
1:     $z_{C_u^{\Delta t}} \leftarrow f_{hist}(\{\sigma(Qh_v + b_q), \forall v \in C_u^{\Delta t}\}, hist_u^{\Delta t})$
2:     $z_u \leftarrow \sigma(W \cdot CONCAT(h_u, z_{C_u^{\Delta t}}) + b_w)$
3:     $z_u \leftarrow \dfrac{z_u}{\|z_u\|_2}$

---

As shown in Algorithm 1, given the importance weighted context ($C_u^{\Delta t}, hist_u^{\Delta t}$) for a node u, the time-dependent graph convolutional neural network 404 transforms the representations $z_v, \forall v \in C_u^{\Delta t}$ through a fully connected layer with nonlinear activation function σ and applies a weighted aggregation $f_{hist}$ using $hist_u^{\Delta t}$ on the resulting vectors from the fully connected layer. This provides a representation $z_{C_u^{\Delta t}}$ of the entire importance weighted temporal context of node u. The time-dependent graph convolutional neural network 404 can concatenate the aggregated context representation $z_{C_u^{\Delta t}}$ with the current representation $h_u$ of node u. The time-dependent graph convolutional neural network 404 can transform the concatenated vector through another fully connected layer with nonlinear activation function a to obtain new representation $z_u$ for node u that incorporates the information about the node itself and its importance weighted temporal context within the transaction graph 402.

In one or more embodiments, the fraudulent transaction detection system 106 further generates similarity probabilities for pairs of digital identities based on node embeddings generated by the time-dependent graph convolutional neural network 404. FIG. 4C illustrates a block diagram of the fraudulent transaction detection system 106 generating a similarity probability for a pair of digital similarities in accordance with one or more embodiments.

As shown in FIG. 4C, the fraudulent transaction detection system 106 can generate similarity probabilities based on the node embeddings 414a-414f of the nodes that correspond to the digital identities represented within the transaction graph 402. In one or more embodiments, the fraudulent transaction detection system 106 generates a similarity probability for each pair of digital identities represented within the transaction graph 402. In some embodiments, the fraudulent transaction detection system 106 generates a similarity probability for a particular pair of digital identities (e.g., a user-selected pair of digital identities).

As further shown in FIG. 4C, to generate a similarity probability for a particular pair of digital identities (e.g., identities corresponding to node A and node C), the fraudulent transaction detection system 106 utilizes a binary classifier 420 to analyze the node embeddings corresponding to the digital identities (e.g., node embedding 414a and 414c). Indeed, the fraudulent transaction detection system 106 can utilize the binary classifier 420 to generate the similarity probability 422 based on the node embeddings. In one or more embodiments, the similarity probability 422 provides a percentage, a fraction, or other value that indicates the similarity between the digital identities. In one or more embodiments, the fraudulent transaction detection system 106 utilizes the similarity probability 422 as the likelihood that the digital identities originate from the same entity (e.g., user).

Thus, the fraudulent transaction detection system 106 can utilize a time-dependent graph convolutional neural network to generate similarity probabilities for pairs of digital identities. Indeed, the fraudulent transaction detection system 106 can utilize the time-dependent graph convolutional neural network to generate node embeddings corresponding to a pair of digital identities, and the fraudulent transaction detection system 106 can generate a similarity probability based on the node embeddings. The algorithms and acts described with reference to FIGS. 4A-4C can comprise the corresponding structure for performing a step for utilizing a time-dependent graph convolutional neural network to generate a similarity probability for a pair of digital identities from a plurality of digital identities.

In one or more embodiments, the fraudulent transaction detection system 106 trains a time-dependent graph convolutional neural network to generate similarity probabilities for pairs of digital identities. In some embodiments, the fraudulent transaction detection system 106 trains the time-dependent graph convolutional neural network in an unsupervised setting by applying a graph-based loss function to learn useful and temporally predictive representation. In particular, the fraudulent transaction detection system 106 can apply the loss function to the output node representation $z_u, \forall u \in V$ and optimize the weight matrices $W^k, \forall k \in \{1, \ldots, K\}$.

In one or more embodiments, the fraudulent transaction detection system 106 uses a hinge loss-based loss function to maximize the similarity of representations within a context for a node while maximizing the discrimination for nodes that are beyond the node context. Indeed, by using the hinge loss-based function, the fraudulent transaction detection system 106 can attempt to achieve an inner product between a node and its temporal context that is at least greater than Δ when compared to the inner product between the node and the out of context nodes in the transaction graph. The fraudulent transaction detection system 106 can tune Δ based on application domain requirements. Accordingly, in one or more embodiments, the fraudulent transaction detection system 106 defines the loss function for a pair of node representations $(z_u, z_v)$ as follows where $P_n(u)$ is a negative sampling distribution for the out of context nodes for the node U:

$$\mathcal{J}_G(z_u, z_v) = \mathbb{E}_{i \sim P_n(u)} \max\{0, z_u^T z_i - z_u^T z_v + \Delta\} \quad (3)$$

In one or more embodiments, the fraudulent transaction detection system 106 samples the negative examples by sampling a set of nodes at random from the graph G (i.e., the transaction graph) and uses the sampled nodes as the negative examples for a minibatch. In some embodiments, the fraudulent transaction detection system 106 samples a set of nodes from the out neighbors of the temporal context for a node as negative examples. In some instances, the fraudulent transaction detection system 106 utilizes several iterations of training where the initial training iterations use the common negative examples set and the subsequent training iterations increase the number of node specific negative examples.

Algorithm 2, presented below, provides a characterization of how the fraudulent transaction detection system 106 executes training of the time-dependent graph convolutional neural network in accordance with one or more embodiments.

---

Algorithm 2 Learn Temporal Embedding

Input: Graph G; input features $\{X_u, \forall u \in V\}$; depth K; non-linearity function σ; temporal neighborhood function $C^{\Delta t}$ :
  u → $(C_u^{\Delta t}, \text{hist}_u^{\Delta t})$; weighting function $f_{hist}$
Output: Learned weights Q, W, $b_q$, $b_w$
1:   $\mathcal{N}_{time}^{(k)} \leftarrow \{ \{u\} \cdot | \forall u \in V\}$   ▷ Construct temporal neighborhood
2:   for u ∈ V do
3:     for k = K . . . 1 do
4:       $\mathcal{N}_{u, time}^{(k-1)} \leftarrow \mathcal{N}_{u, time}^{(k)} \cup C_v^{\Delta t}, \forall v \in \mathcal{N}_{u, time}^{(k)}$
5:     end for
6:   end for
7:
8:   $h_u^0 \leftarrow X_u, \forall u \in V$   ▷ Generating Temporal Embedding
9:
10:  for u ∈ V do
11:    for k = 1 . . . K do
12:      H ← $\{h_v, \forall v \in C_u^{\Delta t}\}$
13:      $h_u^k \leftarrow \text{FORWARD}(h_u^{k-1}, H)$
14:    end for
15:  end for
16:
17:  for u ∈ V do
18:    $z_u \leftarrow \sigma(W_K h^{(K)} + b_o)$
19:  end for
20:
21:  BACKPROPAGATE($\mathcal{J}_G$, Z; Q, W, $b_q$, $b_w$)

---

As shown in Algorithm 2, the fraudulent transaction detection system 106 computes the temporal neighborhood of each node. The fraudulent transaction detection system 106 applies the K-layered convolution to generate the representation of the nodes. The fraudulent transaction detection system 106 passes the output of the final convolution layer through a fully connected layer to generate the final node embeddings $z_u, \forall u \in V$. Accordingly, the fraudulent transaction detection system 106 learns a set of parameters for the time-dependent graph convolutional neural network $(Q^{(k)}, b_q^{(k)}, W^{(k)}, b_w^{(k)})$ along with the weights of the final fully connected layer.

Upon generating the node embeddings, the fraudulent transaction detection system 106 can determine whether a digital identity corresponds to a fraudulent entity using a machine learning technique (e.g., a machine learning model). In particular, the fraudulent transaction detection system 106 can provide the node embeddings generated by the time-dependent graph convolutional neural network 404 to a trained machine learning model. The fraudulent transaction detection system 106 can utilize the trained machine learning model to determine whether a given digital identity corresponds to a fraudulent entity based on those node embeddings. For example, the fraudulent transaction detection system 106 can use the node embeddings as features to identify fraudulent entities. The machine learning model can comprise a classification model or other machine learning model that provided features can determine whether a digital identity corresponds to a fraudulent entity.

For instance, as previously mentioned, based on a similarity probability generated for a pair of digital identities, the fraudulent transaction detection system 106 can determine whether a digital identify from the pair of digital identities corresponds to a fraudulent transaction. FIG. 5 illustrates a block diagram of the fraudulent transaction detection system 106 determining whether a digital identity from a pair of digital identities corresponds to a fraudulent transaction (as shown by box 504) based on a similarity probability 502 in accordance with one or more embodiments.

In one or more embodiments, the fraudulent transaction detection system 106 determines whether a digital transaction is a fraudulent transaction by determining whether an associated digital identity corresponds to a fraudulent entity (e.g., user). Indeed, by determining that a digital identity corresponds to a fraudulent entity, the fraudulent transaction detection system 106 can determine that digital transactions originating from the fraudulent entity are also fraudulent. Thus, the fraudulent transaction detection system 106 can utilize the node embeddings that correspond to digital identities to identify fraudulent transactions.

In some embodiments, the fraudulent transaction detection system 106 determines whether a digital identity corresponds to a fraudulent entity by comparing the digital identity with another digital identity that is known to be associated with a fraudulent entity. In other words, the fraudulent transaction detection system 106 can compare the digital identity with another digital identity that is associated with previously-determined fraudulent transactions.

To illustrate, the fraudulent transaction detection system 106 can identify a digital identity having an unknown fraudulent status. The fraudulent transaction detection system 106 can pair the digital identity with another digital identity having a previously-determined fraudulent status (i.e., it is known that the digital identity is associated with a fraudulent entity). Specifically, the fraudulent transaction detection system 106 can compare the node embeddings corresponding to the digital identities to generate a similarity probability (e.g., a similarity score). In one or more embodiments, the fraudulent transaction detection system 106 determines whether the similarity probability satisfies a probability threshold. Indeed, in some instances, the fraudulent transaction detection system 106 determines that two digital identities originate from the same entity if the similarity probability satisfies a probability threshold. Based on the similarity probability satisfying the probability threshold and that the one digital identity has a previously-determined fraudulent status, the fraudulent transaction detection system 106 can determine that the second digital identity is associated with a fraudulent entity. Accordingly, the fraudulent transaction detection system 106 can determine that the digital identity is associated with a fraudulent transaction.

Figure 6A:
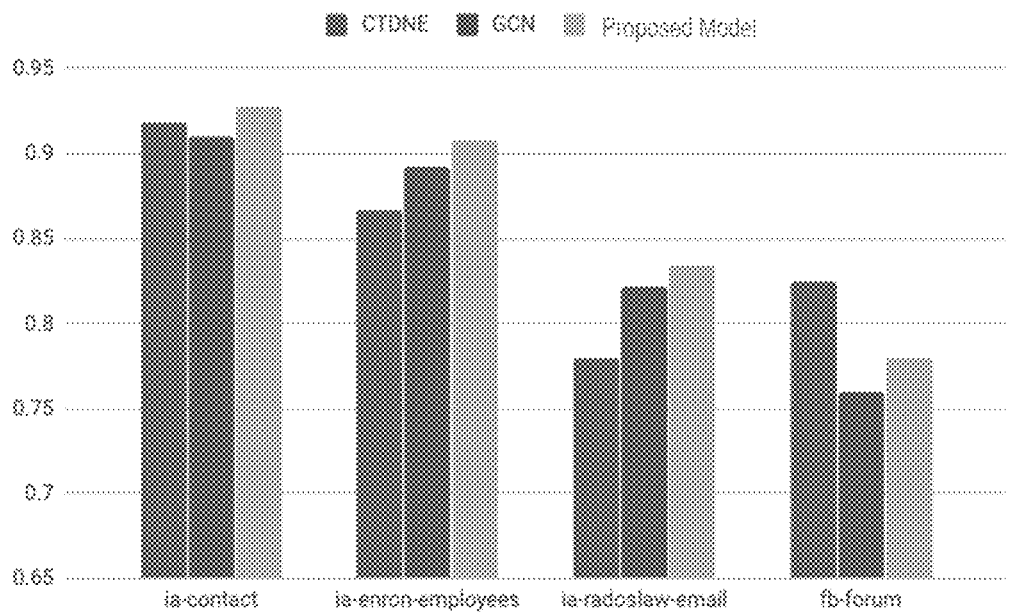
FIGS. 6A-6C illustrate graphs reflecting experimental results regarding the effectiveness of the fraudulent transaction detection system in accordance with one or more embodiments.
Figure 6B:
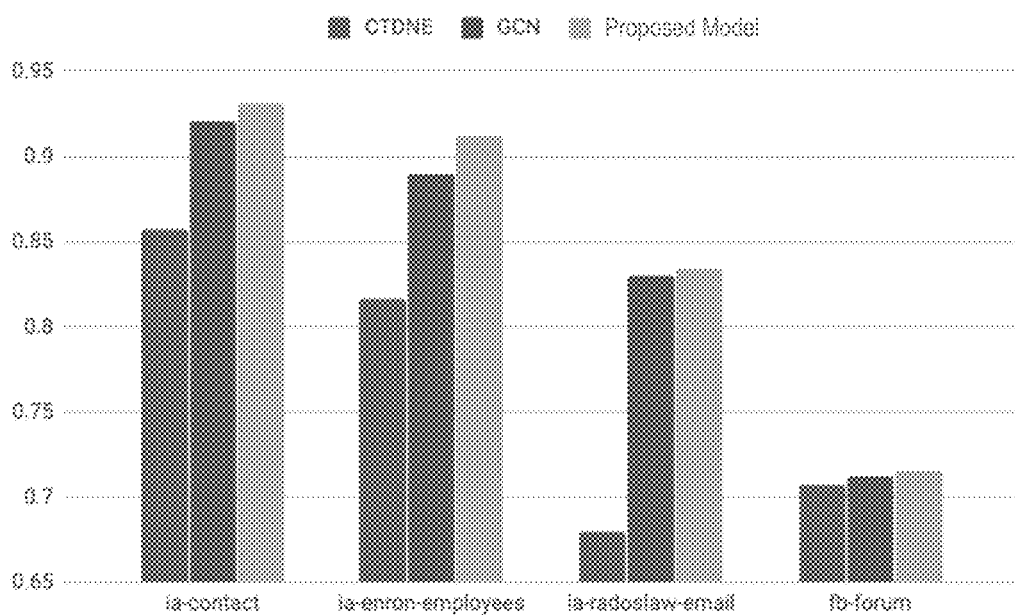
Figure 6C:
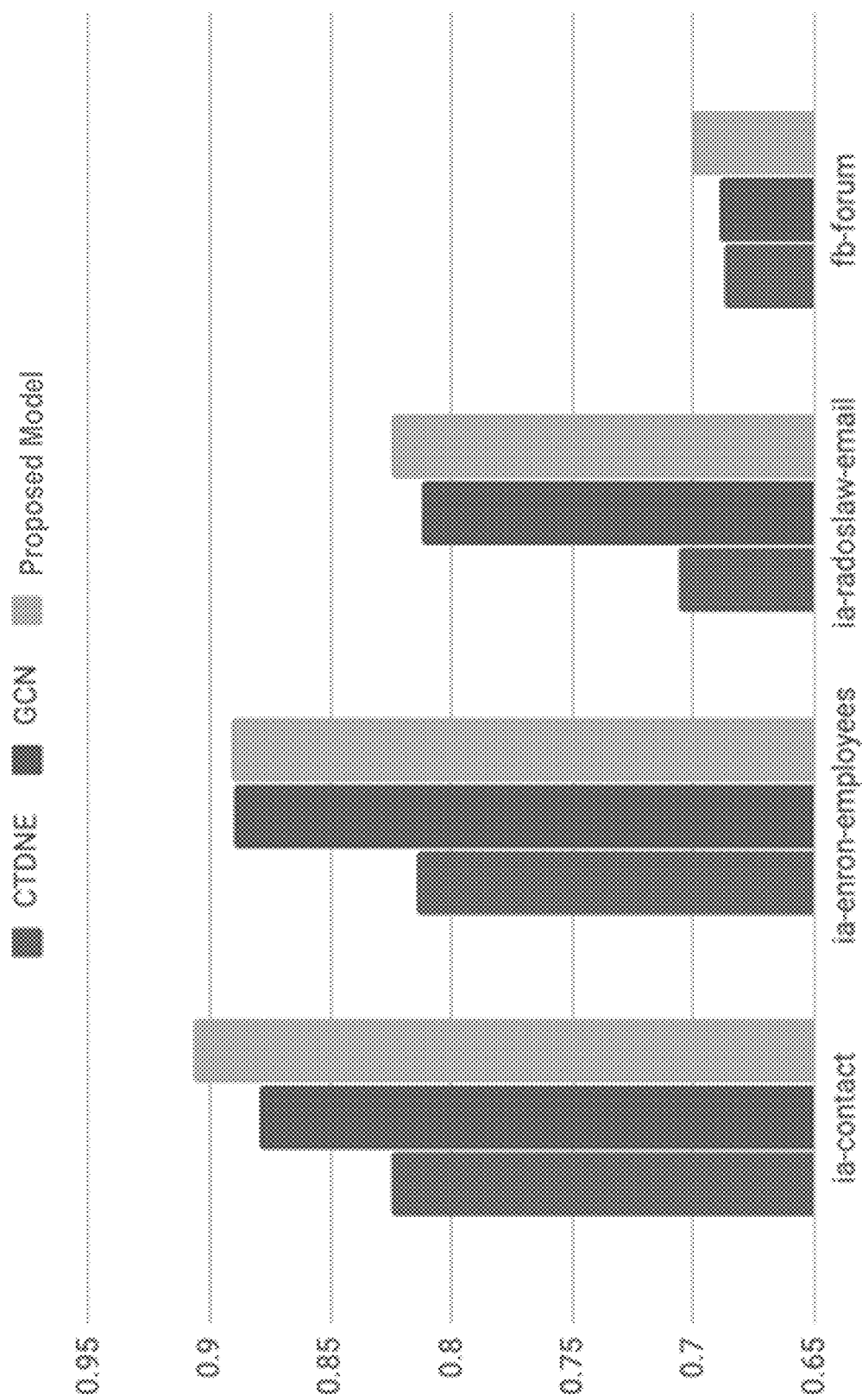

As mentioned above, utilizing the time-dependent graph convolutional neural network can allow the fraudulent transaction detection system 106 to determine the similarity between digital identities more accurately, leading to more accurate fraudulent transaction. Researchers have conducted studies to determine the accuracy of one or more embodiments of the time-dependent graph convolutional neural network using a wide range of temporal graphs with different structural and temporal characteristics from different application domains. FIGS. 6A-6C each illustrate a graph reflecting experimental results regarding the effectiveness of the time-dependent graph convolutional neural network used by the fraudulent transaction detection system 106 in accordance with one or more embodiments.

As shown in FIGS. 6A-6C, the researchers measured the performance of the of the time-dependent graph convolutional neural network in across four data sets. In particular, the "ia-contact" data set includes 274 nodes and 28.2 thousand edge connections. The "ia-enron employees" data set includes 151 nodes and 50.5 thousand edge connections. The "fb-forum" data set includes 899 nodes and 33.7 thousand edge connections. The "ia-radoslaw-email" data set includes 167 nodes and 82.9 thousand edge connections.

Further, as shown in FIGS. 6A-6C, the researchers compared the performance of the time-dependent graph convolutional neural network against the performance of a continuous-time dynamic network embedding (CTDNE) model and a graph convolutional network (GCN) model. The researchers followed a similar strategy for training and testing each model. For example, the researchers utilized 75% of the edges from the datasets to learn the embeddings. Further, the researchers used 25% of the edges as positive link examples and sampled an equal number of negative links. For the edge representation, the researchers used the Hadamard distance between the connecting nodes.

The graphs of FIGS. 6A-6C illustrates the performance of each tested model as measured using AUC of ROC. In particular, the graph of FIG. 6A illustrates the performance of each model when using an embedding of 128 dimensions. Additionally, the graph of FIG. 6B illustrates the performance of each model when using an embedding of 28 dimensions. And the graph of FIG. 6C illustrates the performance of each model using an embedding of 10 dimensions. As shown in FIGS. 6A-6C, the time-dependent graph convolutional neural network generally performs better than the other models, obtaining a higher AUC value. Notably, the time-dependent graph convolutional neural network consistently provides improved performance across the data sets when using embeddings of relatively lower dimensions.

Figure 7:
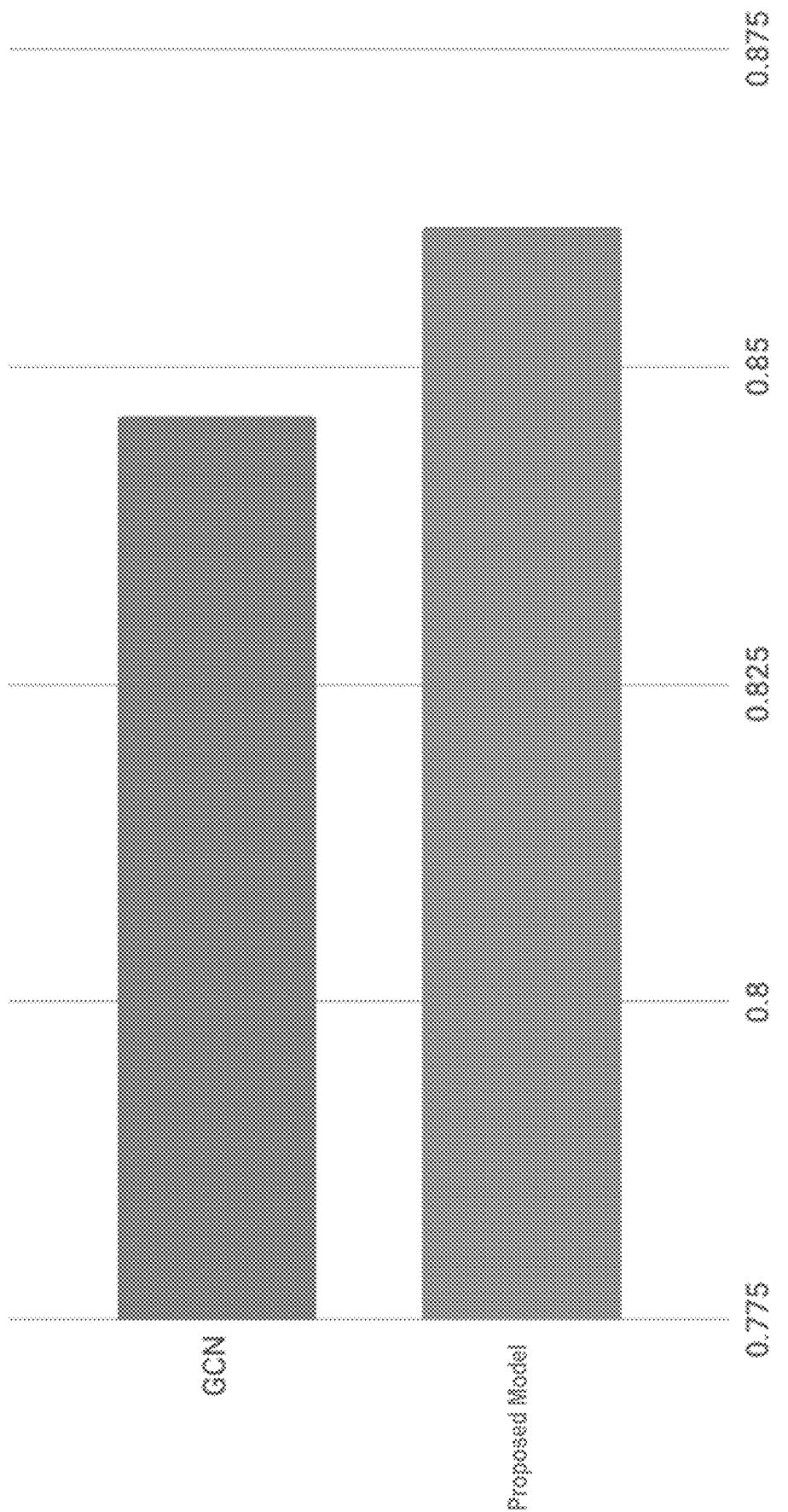
FIG. 7 illustrates a graph reflecting further experimental results regarding the effectiveness of the fraudulent transaction detection system in accordance with one or more embodiments.

FIG. 7 illustrates a graph reflecting additional experimental results regarding the effectiveness of the time-dependent graph convolutional neural network used by the fraudulent transaction detection system 106 in accordance with one or more embodiments. In particular, the graph of FIG. 7 illustrates the performance of the time-dependent graph convolutional neural network on a subset of the data discussed above with regard to FIGS. 6A-6C. Similar to the graphs of FIGS. 6A-6C, the graph of FIG. 7 measures the performance of the time-dependent graph convolutional neural network using AUC of ROC.

Further, the graph of FIG. 7 compares the performance of the time-dependent graph convolutional neural network with a GCN model. Though the GCN model is capable of analyzing attributed networks (e.g., graphs where the nodes are associated with one or more attributes), the GCN model does not generate node embeddings using temporal random walks. Accordingly, it is notable that the time-dependent graph convolutional neural network provides improved performance over the GCN model.

Figure 8:
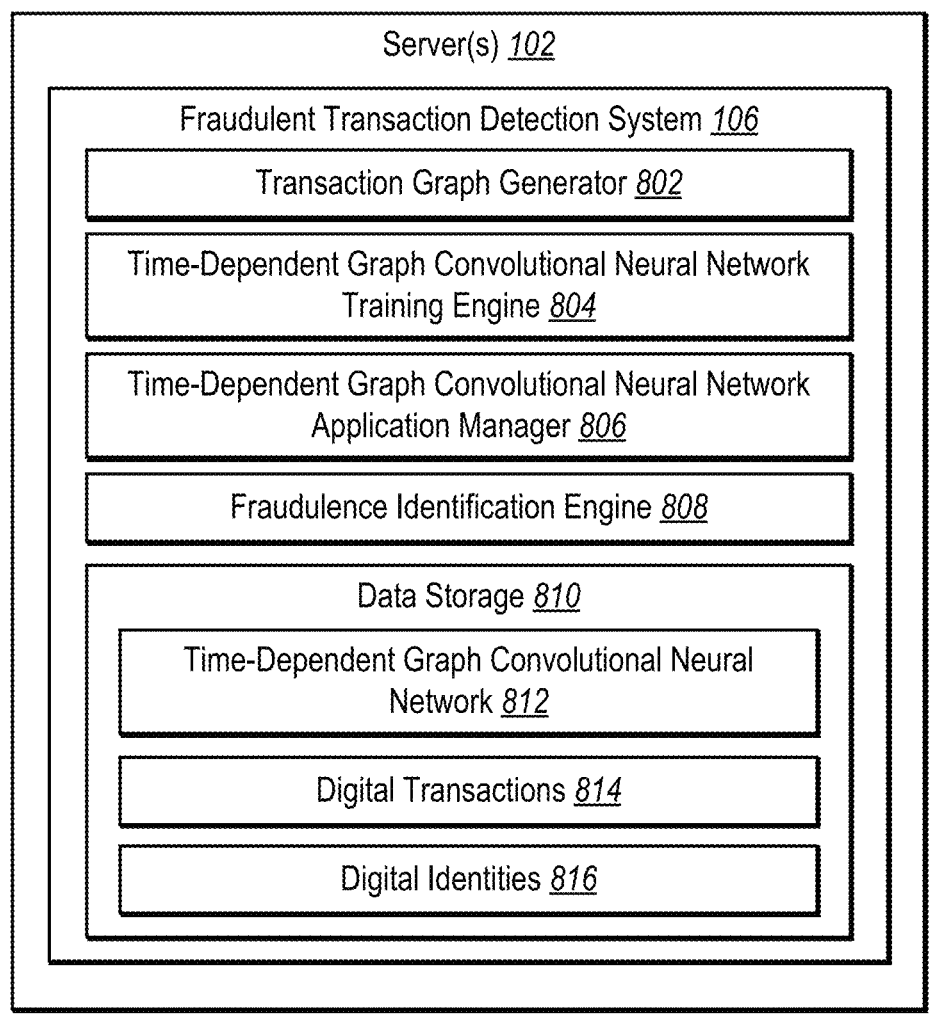
FIG. 8 illustrates a schematic diagram of a fraudulent transaction detection system in accordance with one or more embodiments.

Turning now to FIG. 8, additional detail will now be provided regarding various components and capabilities of the fraudulent transaction detection system 106. In particular, FIG. 8 illustrates the fraudulent transaction detection system 106 implemented by the server(s) 102. As shown, the fraudulent transaction detection system 106 can include, but is not limited to, a transaction graph generator 802, a time-dependent graph convolutional neural network training engine 804, a time-dependent graph convolutional neural network application manager 806, a fraudulence identification engine 808, and data storage 810 (which includes a time-dependent graph convolutional neural network 812, digital transaction 814, and digital identities 816).

As just mentioned, and as illustrated in FIG. 8, the fraudulent transaction detection system 106 includes the transaction graph generator 802. In particular, the transaction graph generator 802 can generate a transaction graph that corresponds to a plurality of digital identities and associated digital transactions. For example, the transaction graph generator 802 can generate a plurality of nodes that correspond to the plurality of digital identities. Further, the transaction graph generator 802 can generate edge connections corresponding to the digital transactions. The transaction graph generator 802 can use an edge connection to connect nodes representing the digital identities that engaged in the digital transaction represented by the edge connection. In one or more embodiments, the transaction graph generator 802 can associate transaction timestamps with the edge connections.

Additionally, as shown in FIG. 8, the fraudulent transaction detection system 106 includes the time-dependent graph convolutional neural network training engine 804. In particular, the time-dependent graph convolutional neural network training engine 804 can train a time-dependent graph convolutional neural network to generate similarity probabilities for pairs of digital identities. In one or more embodiments, the time-dependent graph convolutional neural network training engine 804 trains the time-dependent graph convolutional neural network in an unsupervised setting by applying a graph-based loss function, such as a hinge loss-based loss function.

As shown in FIG. 8, the fraudulent transaction detection system 106 further includes the time-dependent graph convolutional neural network application manager 806. In particular, the time-dependent graph convolutional neural network application manager 806 can utilize the time-dependent graph convolutional neural network trained by the time-dependent graph convolutional neural network training engine 804. For example, the time-dependent graph convolutional neural network application manager 806 can utilize a trained time-dependent graph convolutional neural network to analyze a transaction graph (e.g., generated by the transaction graph generator 802) and generate similarity probabilities for pairs of digital identities represented therein.

Further, as shown in FIG. 8, the fraudulent transaction detection system 106 includes the fraudulence identification engine 808. In particular, the fraudulence identification engine 808 can determine whether digital identities correspond to fraudulent transactions. For example, the fraudulence identification engine 808 can, based on a similarity probability generated for a pair of digital identities by the time-dependent graph convolutional neural network application manager 806, determine whether a digital identity from the pair is associated with a fraudulent entity. Thus, the fraudulence identification engine 808 can determine that a digital transaction associated with that digital identity is a fraudulent transaction.

As shown in FIG. 8, the fraudulent transaction detection system 106 also includes data storage 810. In particular, data storage 810 includes the time-dependent graph convolutional neural network 812, digital transactions 814, and digital identities 816. The time-dependent graph convolutional neural network 812 can store the time-dependent graph convolutional neural network trained by the time-dependent graph convolutional neural network training engine 804 and used by the time-dependent graph convolutional neural network application manager 806. Digital transactions 814 and digital identities 816 can store identified digital transactions and the associated digital identities, respectively. The transaction graph generator 802 can generate a transaction graph based on the data stored in digital transactions 814 and digital identities 816.

Each of the components 802-816 of the fraudulent transaction detection system 106 can include software, hardware, or both. For example, the components 802-816 can include one or more instructions stored on a computer-readable storage medium and executable by processors of one or more computing devices, such as a client device or server device. When executed by the one or more processors, the computer-executable instructions of the fraudulent transaction detection system 106 can cause the computing device(s) to perform the methods described herein. Alternatively, the components 802-816 can include hardware, such as a special-purpose processing device to perform a certain function or group of functions. Alternatively, the components 802-816 of the fraudulent transaction detection system 106 can include a combination of computer-executable instructions and hardware.

Furthermore, the components 802-816 of the fraudulent transaction detection system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-816 of the fraudulent transaction detection system 106 may be implemented as a stand-alone application, such as a desktop or mobile application. Furthermore, the components 802-816 of the fraudulent transaction detection system 106 may be implemented as one or more web-based applications hosted on a remote server. Alternatively, or additionally, the components 802-816 of the fraudulent transaction detection system 106 may be implemented in a suite of mobile device applications or "apps." For example, in one or more embodiments, the fraudulent transaction detection system 106 can comprise or operate in connection with digital software applications such as ADOBE® EXPERIENCE CLOUD®, ADOBE® COMMERCE CLOUD®, or ADOBE® MAGENTO®. "ADOBE," "EXPERIENCE CLOUD," "COMMERCE CLOUD," and "MAGENTO" are either registered trademarks or trademarks of Adobe Inc. in the United States and/or other countries.

Figure 9:
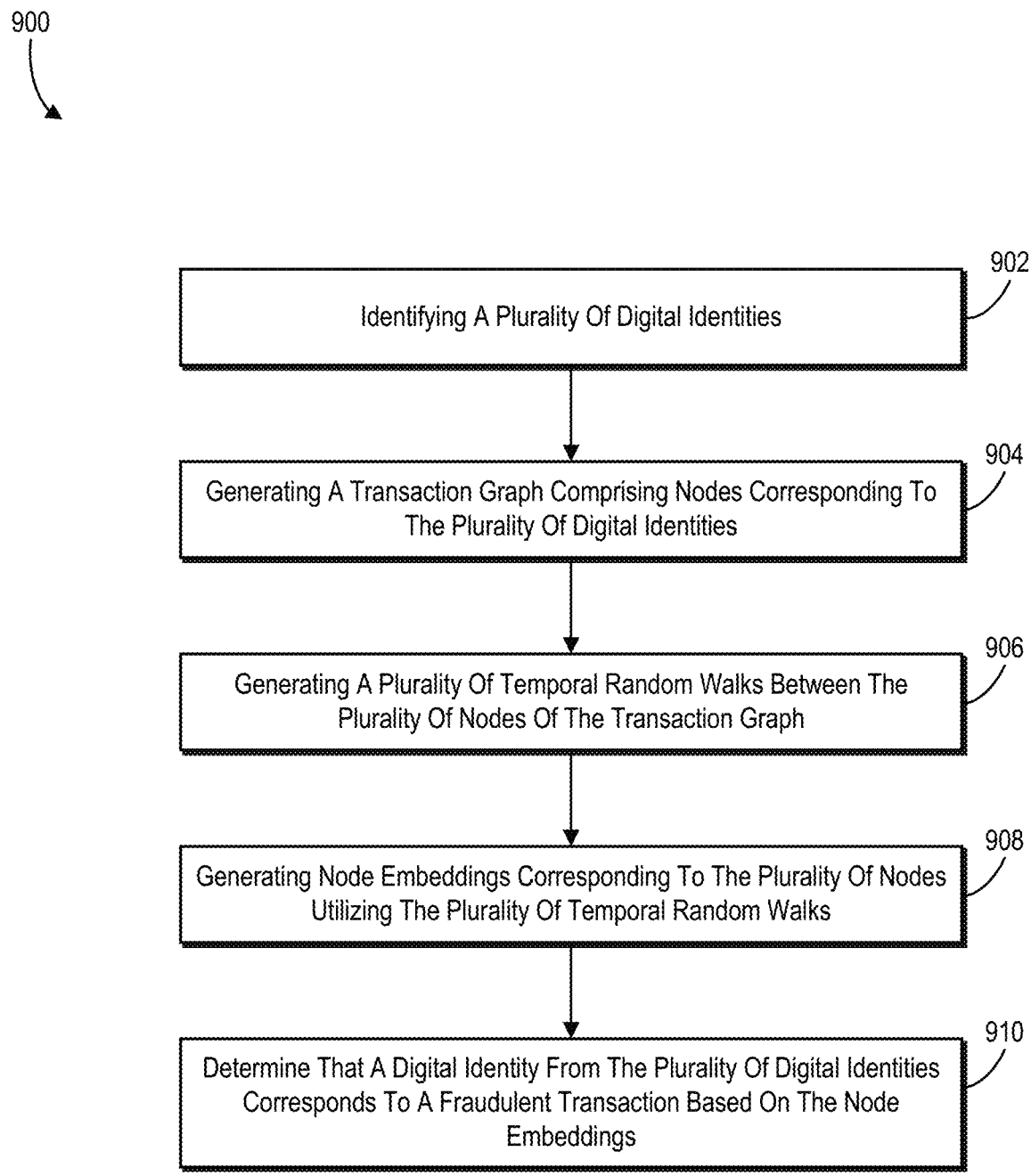
FIG. 9 illustrates a flowchart of a series of acts for determining that a digital identity is associated with a fraudulent transaction in accordance with one or more embodiments.

FIGS. 1-8, the corresponding text and the examples provides a number of different methods, systems, devices, and non-transitory computer-readable media of the fraudulent transaction detection system 106. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

As mentioned, FIG. 9 illustrates a flowchart of a series of acts 900 for determining that a digital identity is associated with a fraudulent transaction in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. For example, in some embodiments, the acts of FIG. 9 can be performed, in a digital medium environment for executing digital transactions, as part of a computer-implemented method for identifying fraudulent transactions. Alternatively, a non-transitory computer-readable medium can store instructions thereon that, when executed by at least one processor, cause a computing device to perform the acts of FIG. 9. In some embodiments, a system can perform the acts of FIG. 9. For example, in one or more embodiments, a system includes at least one memory device comprising a plurality of digital identities corresponding to a plurality of digital transactions; and a time-dependent graph convolutional neural network trained to generate similarity probabilities for nodes in transaction graphs. The system can further include at least one server device configured to cause the system to perform the acts of FIG. 9.

The series of acts 900 includes an act 902 of identifying digital identities. For example, the act 902 involves identifying a plurality of digital identities corresponding to a plurality of digital transactions. In one or more embodiments, the plurality of digital identities comprises at least one of an email address, an IP address, a credit card identifier, or a device identifier.

The series of acts 900 also includes an act 904 of generating a transaction graph. For example, the act 904 involves generating a transaction graph comprising edge connections between a plurality of nodes corresponding to the plurality of digital identities. More particularly, act 904 can involve generating a node for each of the plurality of digital identities and generating the edge connections between the plurality of nodes based on digital transactions linking the digital identities. In one or more embodiments, the transaction graph comprises a first node corresponding to a first digital identity associated with a set of digital transactions from the plurality of digital transactions; a second node corresponding to a second digital identity associated with the set of digital transactions from the plurality of digital transactions; and a set of edge connections between the first node and the second node, the set of edge connections corresponding to the set of digital transactions.

The series of acts 900 further includes an act of generating a plurality of temporal random walks between the plurality of nodes of the transaction graph. For example, act 906 can involve traversing the nodes of the transaction graph in a random or semi-random manner, where traversal from one node to an adjacent node is allowed or disallowed based on a time element associated with the nodes.

The series of acts 900 further includes an act 908 of generating node embeddings for the nodes of the transaction graph. For example, the act 908 involves utilizing a time-dependent graph convolutional neural network to generate, based on the edge connections of the transaction graph, node embeddings corresponding to the plurality of nodes utilizing the plurality of temporal random walks.

In one or more embodiments, the fraudulent transaction detection system 106 generates, based on the edge connections of the transaction graph, the node embeddings corresponding to the plurality of nodes utilizing the plurality of temporal random walks by, for a given node: utilizing temporal random walks to identify a set of nodes associated with the given node based on transaction timestamps corresponding to the edge connections of the transaction graph; identifying, from the set of nodes associated with the given node, neighbor nodes associated with the given node based on visit counts corresponding to the neighbor nodes determined by the temporal random walks; and generating a node embedding for the given node based on prior neural network layer node embeddings of the neighbor nodes.

Said differently, in some embodiments, the fraudulent transaction detection system 106 determines node embeddings corresponding to the plurality of nodes utilizing the time-dependent graph convolutional neural network by, for a given node: identifying, utilizing a plurality of temporal random walks, neighbor nodes associated with the given node based on transaction timestamps corresponding to the edge connections of the transaction graph; and generating a node embedding for the given node based on prior neural network layer node embeddings of the neighbor nodes. In some instances, the fraudulent transaction detection system 106 identifying, utilizing the plurality of temporal random walks, the neighbor nodes associated with the given node based on the transaction timestamps corresponding to the edge connections of the transaction graph by: utilizing the plurality of temporal random walks to identify a set of nodes associated with the given node based on subsets of nodes that correspond to sequences of digital transactions determined based on the transaction timestamps; determining, based on the plurality of temporal random walks, a visit count for each node from the set of nodes; and identifying a plurality of top-visited nodes based on the visit count for each node from the set of nodes, wherein the neighbor nodes associated with the given node comprise the plurality of top-visited nodes. In one or more embodiments, the fraudulent transaction detection system 106 determines weight values for the neighbor nodes based on visit counts associated with the neighbor nodes. Accordingly, the fraudulent transaction detection system 106 can generate the node embedding for the given node based on the prior neural network layer node embeddings of the neighbor nodes by generating the node embedding for the given node further based on the weight values of the neighbor nodes.

In one or more embodiments, the fraudulent transaction detection system 106 identifies identity attributes of the plurality of digital identities. Accordingly, the fraudulent transaction detection system 106 generates the node embeddings corresponding to the plurality of nodes further based on the identity attributes of the plurality of digital identities. For example, in some embodiments, the fraudulent transaction detection system 106 generates the prior neural network layer node embeddings of the neighbor nodes based on identity attributes of a set of digital identities corresponding to a set of nodes associated with the neighbor nodes. In one or more embodiments, the fraudulent transaction detection system 106 identifies the set of nodes associated with the neighbor nodes utilizing one or more temporal random walks. In some instances, the identity attributes comprise at least one of a product name, a product amount, a transaction time, a geo-location, a number of digital transactions associated with a corresponding digital identity, an email address domain, or a type of IP address.

Further, the series of acts 900 includes an act 910 of determining that a digital identity corresponds to a fraudulent transaction. For example, the act 910 involves determining that a digital identity corresponds to a fraudulent transaction based on the node embeddings.

In one or more embodiments, determining that the digital identity corresponds to a fraudulent transaction comprises determining that a similarity probability satisfies a probability threshold, wherein another digital identity from the pair of digital identities is associated with a previously-determined fraudulent transaction. As an example, in some instances, the pair of digital identities comprises the digital identity and a second digital identify associated with a previously-determined fraudulent transaction. Accordingly, the fraudulent transaction detection system 106 can determine that the digital identity from the pair of digital identities corresponds to the fraudulent transaction based on the similarity probability by determining that the similarity probability satisfies a probability threshold; and determining that the second digital identity corresponds to the fraudulent transaction based on the similarity probability satisfying the probability threshold and the second digital identity being associated with the previously-determined fraudulent transaction.

In one or more embodiments, the series of acts 900 further includes acts for modifying the transaction graph and determining similarity probabilities based on the modified transaction graph. For example, in one or more embodiments, the acts include identifying an additional digital identity corresponding to an additional digital transaction; modifying the transaction graph by adding, to the transaction graph, a node corresponding to the additional digital identity; and generating, based on the modified transaction graph, a node embedding for the node corresponding to the additional digital identity utilizing the time-dependent graph convolutional neural network. In some embodiments, adding the node corresponding to the additional digital identity further includes adding edges linking the node to related entities. In some instances, the fraudulent transaction detection system 106 generates, utilizing the time-dependent graph convolutional neural network, an additional similarity probability for an additional pair of digital identities based on the modified transaction graph, the additional pair of digital identities comprising the additional digital identity.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
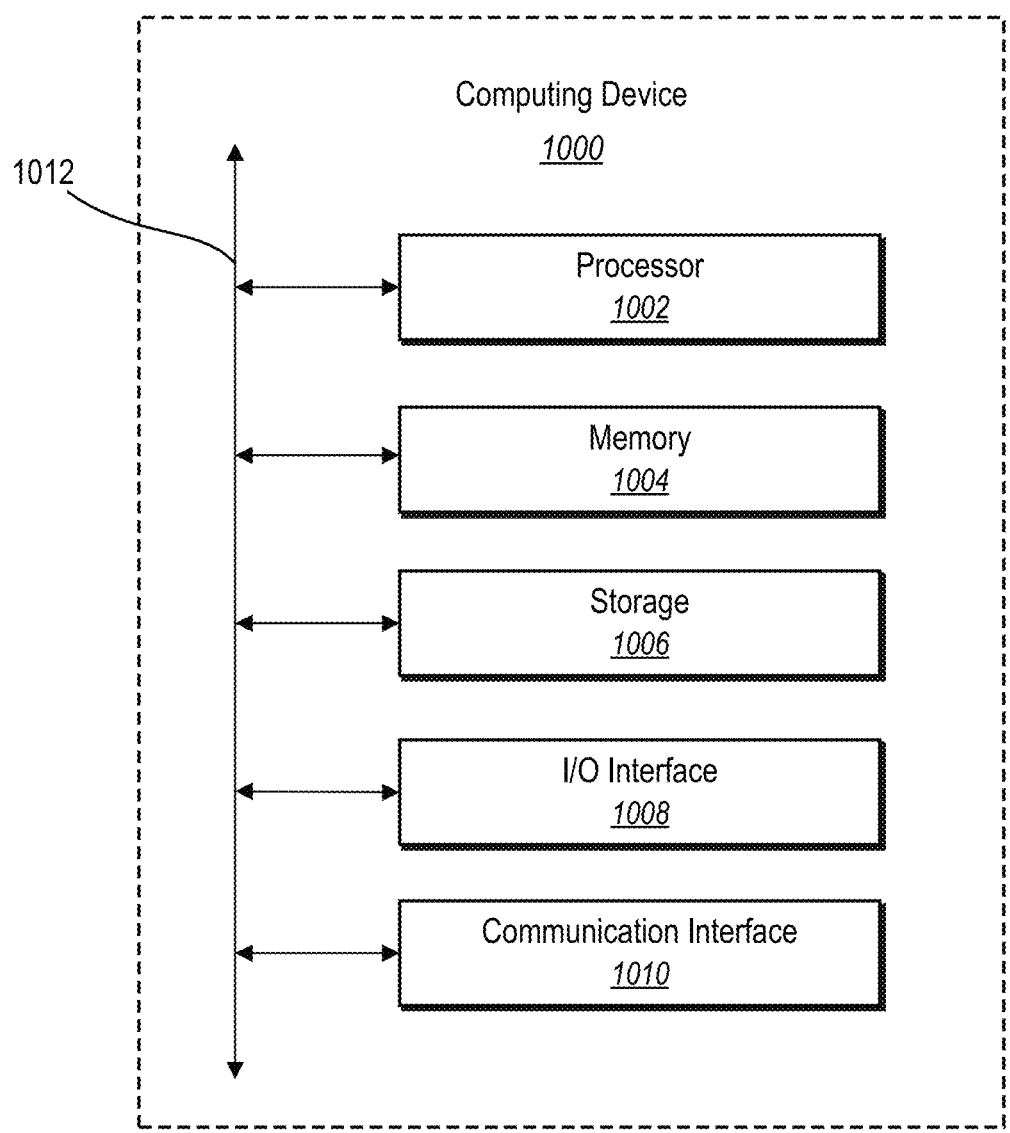
FIG. 10 illustrates a block diagram of an exemplary computing device in accordance with one or more embodiments.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102 and/or the client devices 110a-110n). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for executing digital transactions, a computer-implemented method for identifying fraudulent transactions comprising:
   identifying a plurality of digital identities corresponding to a plurality of digital transactions;
   generating a transaction graph comprising edge connections between a plurality of nodes corresponding to the plurality of digital identities;
   generating a plurality of temporal random walks between the plurality of nodes of the transaction graph;
   performing a step for generating node embeddings for the plurality of nodes of the transaction graph utilizing the plurality of temporal random walks; and
   determining that a digital identity corresponds to a fraudulent transaction based on the node embeddings.

2. The computer-implemented method of claim 1, wherein the plurality of digital identities comprises at least one of an email address, an IP address, a credit card identifier, or a device identifier.

3. The computer-implemented method of claim 1, wherein generating the plurality of temporal random walks between the plurality of nodes of the transaction graph comprises traversing the plurality of nodes of the transaction graph in a random or semi-random manner, where traversal from one node to an adjacent node is allowed or disallowed based on a time element associated with the plurality of nodes.

4. The computer-implemented method of claim 1, wherein generating the transaction graph comprises generating a node for each of the plurality of digital identities and generating the edge connections between the plurality of nodes based on digital transactions linking the plurality of digital identities.

5. A non-transitory computer-readable medium storing instructions thereon that, when executed by at least one processor, cause a computing device to:
   identify a plurality of digital identities corresponding to a plurality of digital transactions;
   generate a transaction graph comprising edge connections between a plurality of nodes corresponding to the plurality of digital identities;
   generate a plurality of temporal random walks between the plurality of nodes of the transaction graph;
   utilize a time-dependent graph convolutional neural network to generate, based on the edge connections of the transaction graph, node embeddings corresponding to the plurality of nodes utilizing the plurality of temporal random walks; and
   determine that a first digital identity from the plurality of digital identities corresponds to a fraudulent transaction based on the node embeddings.

6. The non-transitory computer-readable medium of claim 5, wherein the instructions, when executed by the at least one processor, cause the computing device to generate the node embeddings corresponding to the plurality of nodes further based on identity attributes of the plurality of digital identities.

7. The non-transitory computer-readable medium of claim 6, wherein the identity attributes comprise at least one of:
- a product name;
- a product amount;
- a transaction time;
- a geo-location;
- a number of digital transactions associated with a corresponding digital identity;
- an email address domain; or
- a type of IP address.

8. The non-transitory computer-readable medium of claim 5, further comprising instructions that, when executed by at least one processor, cause the computing device to:
- identify an additional digital identity corresponding to an additional digital transaction;
- modify the transaction graph by adding, to the transaction graph, a node corresponding to the additional digital identity and edges linking related entities; and
- generate, based on the modified transaction graph, a node embedding for the node corresponding to the additional digital identity utilizing the time-dependent graph convolutional neural network.

9. The non-transitory computer-readable medium of claim 5, wherein the instructions, when executed by the at least one processor, cause the computing device to generate, based on the edge connections of the transaction graph, the node embeddings corresponding to the plurality of nodes utilizing the plurality of temporal random walks by, for a given node:
- utilizing temporal random walks to identify a set of nodes associated with the given node based on transaction timestamps corresponding to the edge connections of the transaction graph;
- identifying, from the set of nodes associated with the given node, neighbor nodes associated with the given node based on visit counts corresponding to the neighbor nodes determined by the temporal random walks; and
- generating a node embedding for the given node based on prior neural network layer node embeddings of the neighbor nodes.

10. The non-transitory computer-readable medium of claim 5, wherein the plurality of digital identities comprise at least one of an email address, an IP address, a credit card identifier, or a device identifier.

11. The non-transitory computer-readable medium of claim 5, wherein the instructions, when executed by the at least one processor, cause the computing device to generate a similarity probability for a pair of digital identities by generating the similarity probability based on node embeddings of a pair of nodes corresponding to the pair of digital identities utilizing a binary classifier of the time-dependent graph convolutional neural network.

12. The non-transitory computer-readable medium of claim 11, wherein:
- the pair of digital identities comprises the first digital identity and a second digital identity associated with a previously-determined fraudulent transaction; and
- the instructions, when executed by the at least one processor, cause the computing device to determine that the first digital identity corresponds to the fraudulent transaction by:
  - determining that the similarity probability satisfies a probability threshold; and
  - determining that the first digital identity corresponds to the fraudulent transaction based on the similarity probability satisfying the probability threshold and the second digital identity being associated with the previously-determined fraudulent transaction.

13. The non-transitory computer-readable medium of claim 12, wherein the transaction graph comprises:
- a first node corresponding to the first digital identity associated with a set of digital transactions from the plurality of digital transactions;
- a second node corresponding to the second digital identity associated with the set of digital transactions from the plurality of digital transactions; and
- a set of edge connections between the first node and the second node, the set of edge connections corresponding to the set of digital transactions.

14. A system comprising:
- at least one memory device comprising:
  - a plurality of digital identities corresponding to a plurality of digital transactions; and
  - a time-dependent graph convolutional neural network trained to generate node embeddings for nodes in transaction graphs; and
- at least one server device configured to cause the system to:
- generate a transaction graph comprising edge connections between a plurality of nodes corresponding to the plurality of digital identities;
- determine node embeddings corresponding to the plurality of nodes utilizing the time-dependent graph convolutional neural network by, for a given node:
  - identifying, utilizing a plurality of temporal random walks, neighbor nodes associated with the given node based on transaction timestamps corresponding to the edge connections of the transaction graph; and
  - generating a node embedding for the given node based on prior neural network layer node embeddings of the neighbor nodes; and
- determine that a digital identity corresponds to a fraudulent transaction based on the node embeddings.

15. The system of claim 14, wherein identifying, utilizing the plurality of temporal random walks, the neighbor nodes associated with the given node based on the transaction timestamps corresponding to the edge connections of the transaction graph comprises:
- utilizing the plurality of temporal random walks to identify a set of nodes associated with the given node based on subsets of nodes that correspond to sequences of digital transactions determined based on the transaction timestamps;
- determining, based on the plurality of temporal random walks, a visit count for each node from the set of nodes; and
- identifying a plurality of top-visited nodes based on the visit count for each node from the set of nodes, wherein the neighbor nodes associated with the given node comprise the plurality of top-visited nodes.

16. The system of claim 15, wherein the at least one server device is further configured to cause the system to determine weight values for the neighbor nodes based on visit counts associated with the neighbor nodes, wherein generating the node embedding for the given node based on the prior neural network layer node embeddings of the neighbor nodes comprises generating the node embedding for the given node further based on the weight values of the neighbor nodes.

17. The system of claim 14, wherein the at least one server device is configured to cause the system to generate the prior neural network layer node embeddings of the neighbor nodes based on identity attributes of a set of digital identities corresponding to a set of nodes associated with the neighbor nodes.

18. The system of claim 17, wherein the at least one server device is configured to cause the system to identify the set of nodes associated with the neighbor nodes utilizing one or more temporal random walks.

19. The system of claim 14, wherein the at least one server device is configured to cause the system to:
- identify an additional digital identity corresponding to an additional digital transaction;
- modify the transaction graph by adding, to the transaction graph, a node corresponding to the additional digital identity; and
- generate, based on the modified transaction graph, a node embedding for the node corresponding to the additional digital identity utilizing the time-dependent graph convolutional neural network.

20. The system of claim 14, wherein the at least one server device is configured to cause the system to process the node embeddings utilizing a machine learning model to determine that the digital identity corresponds to a fraudulent transaction.

* * * * *